US012743809B2

(12) United States Patent
Raviv et al.

(10) Patent No.: US 12,743,809 B2
(45) Date of Patent: Sep. 22, 2026

(54) NEURAL NETWORKS ESTIMATION OF A DISTANCE TO A MARINE OBJECT USING CAMERA

(71) Applicant: ORCA AI LTD., Tel Aviv (IL)

(72) Inventors: Dor Raviv, Tel Aviv (IL); Anton Yurkov, Ramat Gan (IL); Yonathan Nativ, Tel Aviv (IL); Doron Weiss, Tel Mond (IL); Shoshana Ben-Maor, Tel Aviv (IL)

(73) Assignee: ORCA AI LTD, Tel Aviv (IL)

(*) Notice: Subject to any disclaimer, the term of this patent is extended or adjusted under 35 U.S.C. 154(b) by 199 days.

(21) Appl. No.: 18/847,980

(22) PCT Filed: Mar. 23, 2023

(86) PCT No.: PCT/IL2023/050308
§ 371 (c)(1),
(2) Date: Sep. 17, 2024

(87) PCT Pub. No.: WO2023/181041
PCT Pub. Date: Sep. 28, 2023

(65) Prior Publication Data
US 2025/0200783 A1 Jun. 19, 2025

(30) Foreign Application Priority Data
Mar. 22, 2022 (IL) .......................................... 291595

(51) Int. Cl.
*G06T 7/70* (2017.01)
*G06V 10/82* (2022.01)

(52) U.S. Cl.
CPC ...... *G06T 7/70* (2017.01); *G06T 2207/20084* (2013.01); *G06T 2207/30181* (2013.01)

(58) Field of Classification Search
CPC ... G06T 7/70; G06T 7/50; G06T 2207/20084; G06T 2207/30181; G06T 2207/20081;
(Continued)

(56) References Cited

U.S. PATENT DOCUMENTS 10,936,907 B2 3/2021 Suresh et al.
2007/0073454 A1* 3/2007 Kaji .................... G05D 1/0206 701/21
(Continued)

FOREIGN PATENT DOCUMENTS

CN 11523465 A 8/2020
CN 111856448 A * 10/2020 ........... G01S 13/867
(Continued)

OTHER PUBLICATIONS

Kim Keunhwan et al. "Robust data Association for Multi-Object Detection in Maritime . . ." IEEE Robotics and Automation Letters, IEEE, vol. 6, No. 3, May 27, 2021, p. 5865-5872, XP011861847.
(Continued)

*Primary Examiner* — Stephen G Sherman
(74) *Attorney, Agent, or Firm* — Whitestone Law, PLLC

(57) ABSTRACT

Some embodiments are directed toward systems and methods comprising, by a processor and memory circuitry implementing at least one neural network, obtaining at least one image of a marine object, acquired by an imaging device of a marine vessel, feeding the at least one image to the at least one neural network, and using the at least one neural network to estimate a distance between the marine vessel and the marine object.

20 Claims, 20 Drawing Sheets

(58) Field of Classification Search

CPC ...... G06V 10/774; G06V 10/82; G06V 20/52; G06N 3/084; G06N 3/09; G08G 3/02; G08G 3/00; B63B 79/10

See application file for complete search history.

(56) References Cited

U.S. PATENT DOCUMENTS

| | | | | |
|---|---|---|---|---|
| 2016/0288711 | A1 | 10/2016 | Gehrke | |
| 2018/0004209 | A1* | 1/2018 | Akuzawa | G05D 1/0206 |
| 2018/0107210 | A1* | 4/2018 | Harnett | B63G 8/001 |
| 2019/0360810 | A1* | 11/2019 | Johnson | G01C 21/005 |
| 2020/0365035 | A1 | 11/2020 | Im et al. | |
| 2021/0357655 | A1 | 11/2021 | Park et al. | |
| 2022/0284712 | A1 | 9/2022 | Musk et al. | |

FOREIGN PATENT DOCUMENTS

| | | | | |
|---|---|---|---|---|
| EP | 1806595 | B1 | 7/2007 | |
| KR | 102311245 | B1 | 10/2021 | |
| WO | WO-2019239460 | A1 * | 12/2019 | H04N 23/60 |

OTHER PUBLICATIONS

Jun. 28, 2023, Written Opinion and International Search Report.

* cited by examiner

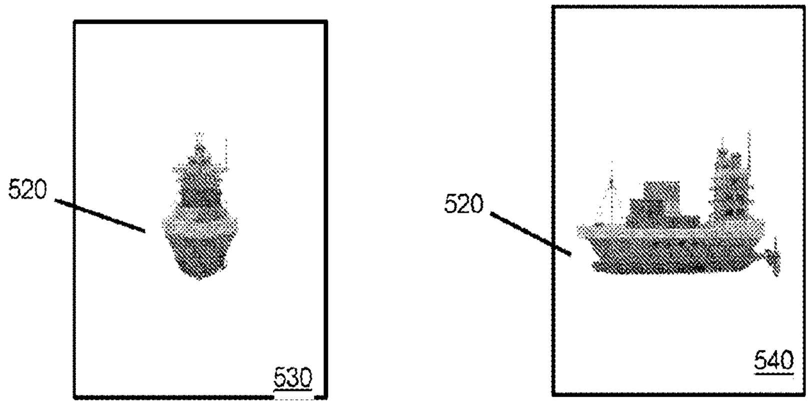
FIG. 5
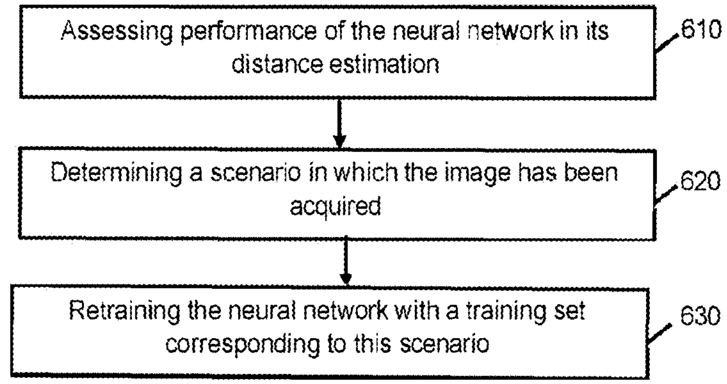
FIG. 6A
P
600
D
FIG. 6B

NEURAL NETWORKS ESTIMATION OF A DISTANCE TO A MARINE OBJECT USING CAMERA

CROSS-REFERENCE TO RELATED APPLICATIONS

This application is a national phase filing under 35 C.F.R. § 371 of and claims priority to PCT Patent Application No. PCT/IL2023/050308, filed on Mar. 23, 2023, which claims the priority benefit under 35 U.S.C. § 119 of Israeli Patent Application No. 291595, filed on Mar. 22, 2022, the content of which is hereby incorporated in its entirety by reference.

TECHNICAL FIELD

The presently disclosed subject matter relates to the field of marine environment.

BACKGROUND

In a marine environment, a marine vessel travels on a route on which it can encounter various situations. Some of these situations can include dangers, e.g., an obstacle to be avoided, zones with dangerous weather, etc.

In order to enable control of the marine vessel (by the crew and/or by an automatic pilot), it is required to determine information on marine objects encountered by the marine vessel.

It is now necessary to provide new methods and systems in order to improve safety and reliability of marine vessels navigation, improve understanding of the marine environment for marine vessels, and improve control of marine vessels. More generally, it is necessary to develop innovative methods in the marine domain, and in particular, in the field of autonomous ships.

GENERAL DESCRIPTION

In accordance with certain aspects of the presently disclosed subject matter, there is provided a system comprising a processor and memory circuitry (PMC), wherein the PMC is operative to implement at least one neural network, wherein the PMC is configured to obtain at least one image of a marine object, acquired by an imaging device of a marine vessel, feed the image to the at least one neural network, and use the at least one neural network to estimate a distance between the marine vessel and the marine object.

In addition to the above features, the system according to this aspect of the presently disclosed subject matter can optionally comprise one or more of features (i) to (xvii) below, in any technically possible combination or permutation:

i. the system is configured to obtain at least one image of a marine object, acquired by an imaging device of a marine vessel, obtain data $D_{height}$ informative of a height of the imaging device at a period of time at which the image has been acquired, feed the image and the data $D_{height}$ to the at least one neural network, and use the at least one neural network to estimate a distance between the marine vessel and the marine object;

ii. the system is configured to use the at least one neural network to determine, using said image, a plurality of different candidate distances between the marine vessel and the marine object;

iii. the system is configured to obtain a plurality of images of a marine object, acquired by the imaging device of the marine vessel at different instants of time of a given period of time, feed each image of the plurality of images to the at least one neural network, use the at least one neural network to estimate, for each image of the plurality of images, one or more candidate distances between the marine vessel and the marine object, thereby obtaining, based on the plurality of images, a set of candidate distances for the given period of time, and use the set of candidate distances to estimate a distance between the marine vessel and the marine object within the given period of time;

iv. the system is configured to determine data $D_{distribution}$ informative of a frequency distribution of the candidate distances within the set of candidate distances, and use the frequency distribution to estimate a distance between the marine vessel and the marine object;

V. the system is configured to obtain data $D_{physical}$ informative of an expected motion of the marine object, and use data $D_{physical}$ to estimate a distance between the marine vessel and the marine object;

vi. the system is configured to obtain a plurality of images of a marine object, acquired by the imaging device of the marine vessel at different instants of time of a given period of time, feed each image of the plurality of images to the at least one neural network, use the at least one neural network to estimate, for each image of the plurality of images, one or more candidate distances between the marine vessel and the marine object, thereby obtaining, based on the plurality of images, a set of candidate distances for the given period of time, and use data $D_{physical}$ to determine whether at least one candidate distance of the set of candidate distances is not acceptable as an estimate of a distance between the marine vessel and the marine object;

vii. the system is configured to obtain at least one image of a marine object, acquired by an imaging device of a marine vessel, feed the image to the at least one neural network, use the at least one neural network to determine a distribution including a plurality of candidate distances, each candidate distance being associated with a probability, upon detection that the distribution does not meet a criterion, generate data which indicates that the at least one neural network has to be retrained;

viii. the system is configured to determine that a distance estimation performed by the at least one neural network does not meet a quality criterion for one or more given images of one or more marine objects acquired by the imaging device which correspond to a same given scenario;

ix. the system is configured to retrain the at least one neural network with a training set of images that match the given scenario;

X. the system is configured to identify the given scenario using data associated with the given images, the data including at least one of (a) or (b) or (c) or (d) or (e): (a) a type of the one or more marine objects, (b) data informative of an environment in which the given images have been acquired, (c) a range of distances in which at which the or more marine objects are located, (d) data informative of an orientation of the one or more marine objects as displayed in the given images, (e) a range of heights of the imaging device, for which the given images have been acquired;

xi. the system is configured to obtain at least one image of a marine object, acquired by the imaging device of the marine vessel, obtain data $D_{environmental}$ informative of an environment in which the image has been acquired, feed the image and data $D_{environmental}$ to the at least one neural network, and use the at least one neural network to estimate a distance between the marine vessel and the marine object;

xii. the system configured to provide the distance to a controller of the marine vessel, wherein the controller is operative to control a trajectory of the marine vessel using the distance;

xiii. the system is configured to obtain one or more images of a marine object, feed the one or more images to the at least one neural network, and use the at least one neural network to estimate a distance between the marine vessel and the marine object, wherein all of the one or more images of the marine object used by the neural network to estimate the distance between the marine vessel and the marine object have been acquired by a same single imaging device of the marine vessel;

xiv. the system is configured to estimate, by the at least one neural network, a distance between the marine vessel and the marine object using an image of the marine object acquired by the imaging device of the marine vessel, without using data informative of the marine object acquired by a sensor different from the imaging device;

xv. the at least one neural network has been trained using a set of images and labelled data, each given image of the set of images comprising a given marine object acquired by a given imaging device of a given marine vessel, wherein the labelled data comprises, for each given image, an estimate of a distance between the given marine vessel and the given marine object, and an estimate of a height of the imaging device at a period of time at which the given image has been acquired;

xvi. the system is configured to obtain at least one image of a marine object, acquired by the imaging device of the marine vessel, obtain data $D_{orientation}$ informative of an orientation of the imaging device at a period of time at which the image has been acquired, feed the image and the data $D_{orientation}$ to the at least one neural network, and use the at least one neural network to estimate a distance between the marine vessel and the marine object; and xvii. the neural network has been trained using a set of images and labelled data, each given image of the set of images comprising a given marine object acquired by a given imaging device of a given marine vessel, wherein the labelled data comprises, for each given image, an estimate of a distance between the given marine vessel and the given marine object, wherein the labelled data further comprises, for at least one given image, data informative of an orientation of the given marine object as displayed in the given image.

In accordance with certain aspects of the presently disclosed subject matter, there is provided a system comprising a processor and memory circuitry (PMC), wherein the PMC is operative to implement at least one neural network, wherein the PMC is configured to obtain a plurality of images, each given image of the plurality of images comprising a given marine object acquired by a given imaging device of a given marine vessel, wherein each given image is associated with a given label indicative of a distance between the given marine vessel and the given marine object, feed each given image of the plurality of images together with the given label to the at least one neural network to train the at least one neural network, wherein the at least one neural network is usable, after said training, to estimate a distance between a marine vessel and a marine object using an image of the marine object acquired by an imaging device of the marine vessel.

In addition to the above features, the system according to this aspect of the presently disclosed subject matter can optionally comprise one or more of features (xviii) to (xxiv) below, in any technically possible combination or permutation:

xviii. the system is configured to, for each given image of the plurality of images, obtain data $D_{height}$ informative of a height of the given imaging device at a period of time at which the given image has been acquired, and feed the given image and the data $D_{height}$ to the at least one neural network for its training;

xix. the system is configured to, for a given image of the plurality of images, obtain the given label indicative of a distance between the given marine vessel and the given marine object using data provided by at least one of (a) a sensor of the given marine vessel different from the imaging device, or (b) a sensor of the given marine object;

xx. the system is configured to obtain first position data informative of a position of first marine objects, wherein the first position data is obtained based on the given image acquired by the given imaging device of the given marine vessel, obtain second position data informative of a position of second marine objects, wherein the second position data is obtained based on data acquired by at least one sensor of the given marine vessel, wherein the at least one sensor is different from the given imaging device, wherein at least some of the first marine objects are the same as at least some of the second marine objects, determine that a marine object of the first marine objects and a marine object of the second marine objects correspond to a same given marine object acquired respectively by the given imaging device and the at least one sensor, and determine the given label indicative of the given distance between the given marine vessel and the given marine object using data provided by the at least one sensor;

xxi. the system is configured to, for a given image of the plurality of images: (a) obtain data $D_{environmental}$ informative of an environment in which the given image has been acquired, and feed the given image and the data $D_{environmental}$ to the neural network for its training, or (b) obtain data $D_{orientation}$ data informative of an orientation of the given marine object as displayed in the given image, and feed the given image and the data $D_{orientation}$ to the at least one neural network for its training;

xxii. the system is configured, for a given scenario in which a given image of a given marine object is acquired by the imaging device, to determine that an estimation of the distance by the neural network does not meet a quality criterion, and retrain the neural network with a training set of images matching the given scenario;

xxiii. the neural network is usable, after said training, to estimate a distance between a marine vessel and a marine object using an image of the marine object acquired by an imaging device of a marine vessel, without using data informative of the marine object acquired by a sensor different from the imaging device; and xxiv. the neural network is usable, after said training, to estimate a distance between a marine vessel and a marine object using one or more images of a marine object acquired by an imaging device of a marine vessel, wherein all of the one or more images of the marine object used by the neural network to estimate the distance between the marine vessel and the marine object have been acquired by a same single imaging device of the marine vessel.

In accordance with certain aspects of the presently disclosed subject matter, there is provided a system comprising a processor and memory circuitry (PMC), wherein the PMC is operative to obtain first position data informative of a position of first marine objects, wherein the first position data is obtained based on a given image acquired by a given imaging device of a given marine vessel, obtain second position data informative of a position of second marine objects, wherein the second position data is obtained based on data acquired by at least one sensor of the given marine vessel, wherein the at least one sensor is different from the given imaging device, wherein at least some of the first marine objects are the same as at least some of the second marine objects, and determine that a marine object of the first marine objects and a marine object of the second marine objects correspond to a same given marine object acquired respectively by the given imaging device and the at least one sensor, determine a given distance between the given marine vessel and the given marine object using data provided by the at least one sensor, and generate a labelled image, wherein the labelled image comprises the given image and a label comprising said given distance.

In addition to the above features, the system according to this aspect of the presently disclosed subject matter can optionally comprise one or more of features (xxV) to (xxvii) below, in any technically possible combination or permutation:

xxv. the system is configured to determine data $D_{camera}$ informative of at least one of a height and an orientation of the imaging device at a period of time at which the given image has been acquired by the imaging device, which optimize a matching between: position of at least some of the first marine objects determined using $D_{camera}$ and the first position data, and second position data of at least some of the second marine objects, according to a criterion;

xxvi. the system is configured to determine a type of the given marine vessel using data provided by the at least one sensor, and associate the type with the labelled image; and xxvii. the at least one sensor is not an imaging device, and/or the at least one sensor includes at least one of a radar and an automatic identification system (AIS) and/or the at least one sensor includes a first sensor and a second sensor, wherein the second sensor is of a different type than the first sensor, and wherein the first sensor and the second sensor are not imaging devices.

In accordance with certain aspects of the presently disclosed subject matter, there is provided a method comprising, by a processor and memory circuitry (PMC) implementing at least one neural network, obtaining at least one image of a marine object, acquired by an imaging device of a marine vessel, feeding the image to the at least one neural network, and using the at least one neural network to estimate a distance between the marine vessel and the marine object.

In addition to the above features, the method according to this aspect of the presently disclosed subject matter can optionally implement one or more of features (i) to (xvii) above (described with reference to the corresponding system), in any technically possible combination or permutation:

In accordance with certain aspects of the presently disclosed subject matter, there is provided a non-transitory storage device readable by a machine, tangibly embodying a program of instructions executable by the machine to perform operations as described with reference to the method above.

In accordance with certain aspects of the presently disclosed subject matter, there is provided a method comprising, by a processor and memory circuitry (PMC) implementing at least one neural network, obtaining a plurality of images, each given image of the plurality of images comprising a given marine object acquired by a given imaging device of a given marine vessel, wherein each given image is associated with a given label indicative of a distance between the given marine vessel and the given marine object, feeding each given image of the plurality of images together with the given label to the neural network to train the at least one neural network, wherein the at least one neural network is usable, after said training, to estimate a distance between a marine vessel and a marine object using an image of the marine object acquired by an imaging device of the marine vessel.

In addition to the above features, the method according to this aspect of the presently disclosed subject matter can optionally implement one or more of features (xviii) to (xxiv) above (described with reference to the corresponding system), in any technically possible combination or permutation:

In accordance with certain aspects of the presently disclosed subject matter, there is provided a non-transitory storage device readable by a machine, tangibly embodying a program of instructions executable by the machine to perform operations as described with reference to the method above.

In accordance with certain aspects of the presently disclosed subject matter, there is provided a method comprising, by a processor and memory circuitry (PMC), obtaining first position data informative of a position of first marine objects, wherein the first position data is obtained based on a given image acquired by a given imaging device of a given marine vessel, obtaining second position data informative of a position of second marine objects, wherein the second position data is obtained based on data acquired by at least one sensor of the given marine vessel, wherein the at least one sensor is different from the given imaging device, wherein at least some of the first marine objects are the same as at least some of the second marine objects, and determining that a marine object of the first marine objects and a marine object of the second marine objects correspond to a same given marine object acquired respectively by the given imaging device and the at least one sensor, determining a given distance between the given marine vessel and the given marine object using data provided by the at least one sensor, and generating a labelled image, wherein the labelled image comprises the given image and a label comprising said given distance.

In addition to the above features, the method according to this aspect of the presently disclosed subject matter can optionally implement one or more of features (xxv) to (xxvii) above (described with reference to the corresponding system), in any technically possible combination or permutation:

In accordance with certain aspects of the presently disclosed subject matter, there is provided a non-transitory storage device readable by a machine, tangibly embodying a program of instructions executable by the machine to perform operations as described with reference to the method above.

According to some embodiments, the proposed solution enables estimation of a distance between a marine vessel and a marine object in an accurate and efficient way.

According to some embodiments, the proposed solution enables estimation of a distance between a marine vessel and a marine object using a single camera.

According to some embodiments, the proposed solution enables estimation of a distance between a marine vessel and a marine object in real time, or quasi real time.

According to some embodiments, the proposed solution enables estimation of a distance between a marine vessel and a marine object using multiple cameras.

According to some embodiments, the proposed solution enables estimation of a distance between a marine vessel and a marine object using only images acquired by a camera, without requiring input from other sensors.

According to some embodiments, the proposed solution enables estimation of a distance between a marine vessel and a marine object using an image acquired by a camera, even if a representation of the marine object in the image has a limited size.

According to some embodiments, the proposed solution enables estimation of a distance between a marine vessel and a marine object using an image acquired by a camera, while being substantially insensitive to motion of the camera and/or to motion of the marine vessel due to the presence of waves.

According to some embodiments, the proposed solution enables estimation of a distance between a marine vessel and a marine object, even at long distances.

According to some embodiments, the proposed solution enables estimation of a distance between a marine vessel and a marine object while taking into consideration environmental conditions.

According to some embodiments, the proposed solution can be easily deployed on a marine vessel.

According to some embodiments, the proposed solution generates, automatically, a dataset of labelled images of marine objects, usable for training a neural network, to determine distance to a marine object using an image thereof.

According to some embodiments, the proposed solution is able to assess in which context the neural network is less efficient to predict the distance to the marine object, in order to retrain the neural network with a training set which focuses on this context.

According to some embodiments, the proposed solution enables accurate and efficient estimation of a distance in the maritime domain, which is a challenging technical domain, since it can involve bad environmental conditions, variations of the height of the marine vessel over time, etc. To the contrary, standard methods for distance estimation (such as triangulation and stereovision) cannot be used and would be both inaccurate and impractical in the marine domain.

BRIEF DESCRIPTION OF THE DRAWINGS

In order to understand the presently disclosed subject matter and to see how it can be carried out in practice, embodiments will be described, by way of non-limiting examples, with reference to the accompanying drawings, in which:

FIG. 5 illustrates an impact of the orientation of the marine object at sea on its representation in the image;

FIG. 6A illustrates an embodiment of a method of assessing performance of the trained neural network;

FIG. 6B illustrates an example of a distribution of candidate distances output by the trained neural network, which indicates that the performance of the trained neural network does not meet a quality criterion;

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification, discussions utilizing terms such as "obtaining", "using", "feeding", "determining", "estimating", "generating" or the like, refer to the action(s) and/or process(es) of a computer that manipulate and/or transform data into other data, said data represented as physical, such as electronic, quantities and/or said data representing the physical objects.

The terms "computer" or "computerized system" should be expansively construed to include any kind of hardware-based electronic device with a data processing circuitry (e.g., digital signal processor (DSP), a GPU, a TPU, a field programmable gate array (FPGA), an application specific integrated circuit (ASIC), microcontroller, microprocessor etc.). The processing circuitry can comprise, for example, one or more processors operatively connected to computer memory, loaded with executable instructions for executing operations, as further described below. The processing circuitry encompasses a single processor or multiple processors, which may be located in the same geographical zone or may, at least partially, be located in different zones, and may be able to communicate together.

Figure 1:
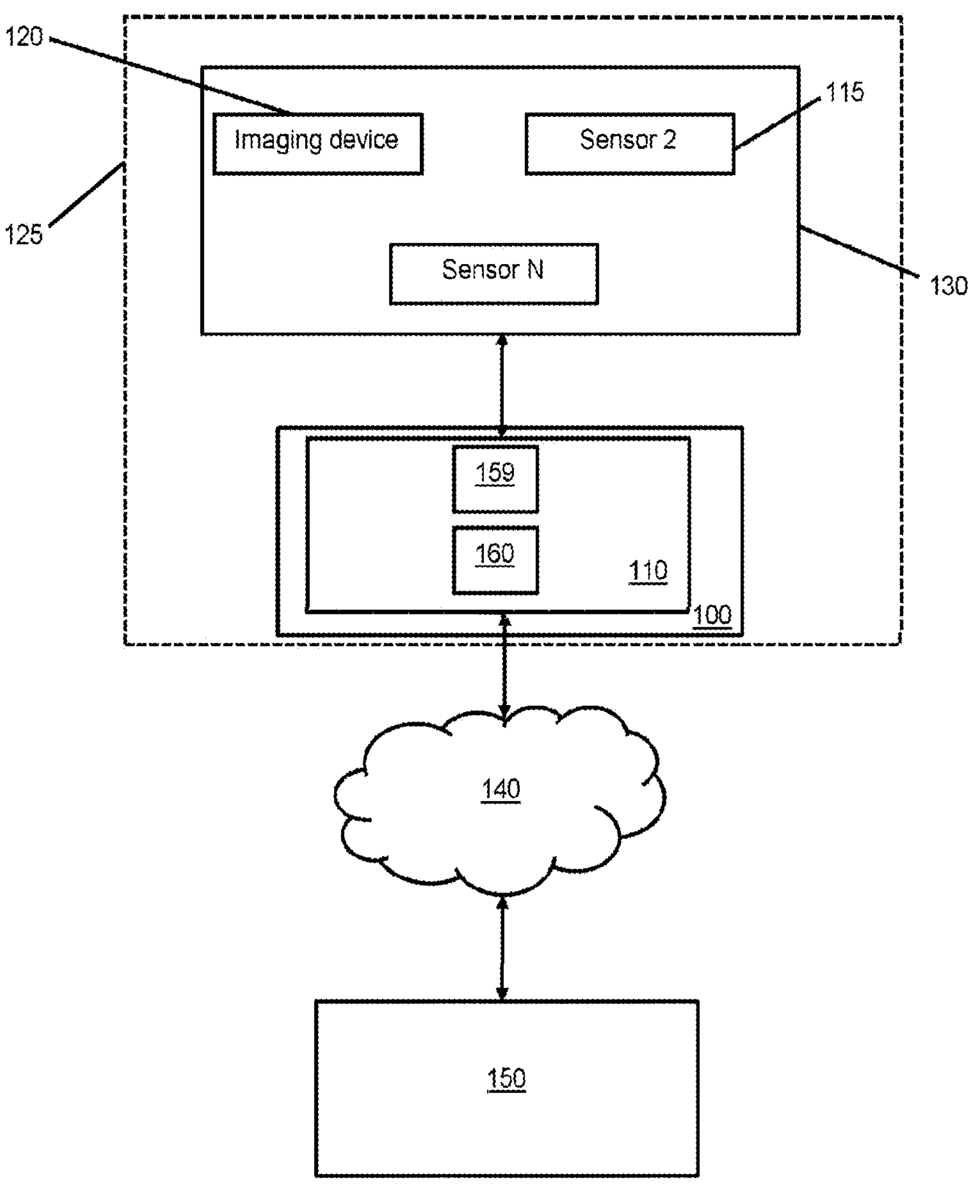
FIG. 1 illustrates an embodiment of a system which can be used to perform one or more of the methods described hereinafter.

FIG. 1 illustrates an embodiment of a computerized system 100 which can be used to perform one or more of the methods described hereinafter. As shown, system 100 comprises a processor and memory circuitry (PMC) 110.

System 100 can be embedded on a marine platform. In particular, the marine platform can be a moving marine platform. The moving marine platform can be e.g., a marine vessel 125. Marine vessels include e.g., ships, boats, hovercrafts, etc.

In some embodiments, system 100 can be embedded on a marine platform which can be stationary, or at least temporarily stationary.

Although embodiments will be described with reference to marine vessels 125, it is to be understood that these embodiments apply similarly to a stationary marine platform.

As shown in FIG. 1, system 100 can obtain data from one or more sensors 130. At least some of the sensors 130 can be located on the marine vessel 125 on which system 100 is located (or on at least one other marine vessel/object communicating with the marine vessel 125 on which system 100 is located).

Sensors 130 collect data during the voyage of the marine vessel 125. The voyage includes portions of the voyage in which the marine vessel is in motion, but can also include portions of the voyage in which the marine vessel is substantially static (e.g., when the marine vessel 125 is moored or docked, such as in a harbor).

Sensors 130 include an imaging device 120 (e.g. a camera), which is mounted on the marine vessel 125.

In some embodiments, the camera includes an infrared camera, a night camera, a day camera, etc.

In some embodiments, sensors 130 include a plurality of imaging devices 120 (which can be distinct). In some embodiments, the imaging devices 120 may have different fields of view (which do not overlap at all), or may have a field of view which can at least partially overlap.

According to some embodiments, sensors 130 include one or more additional sensors 115 (which are not necessarily imaging devices) such as (this list is not limitative) a radar (any type of radar), a LIDAR, an automatic identification system (AIS) (located on the marine vessel 125 and/or on a marine object distinct from the marine vessel 125), a transponder communicating with a GPS located on other marine objects, a system which includes a laser located on the marine vessel 125, and an optical reflector located on another marine object to be located by the marine vessel 125 (reflection of the laser by the reflector enables localization of the other marine object), etc.

In particular, sensors 115 provide information usable to localize marine objects surrounding the marine vessel 125.

The marine vessel 125 itself can include other sensors, such a geo-localization system (e.g., GPS), IMU, velocity and acceleration sensors, a gyro compass, etc.

As explained hereinafter in the specification, system 100 can process data collected by one or more of the sensors 130.

In some embodiments, data output by system 100 can be transmitted through a remote communication network 140 towards e.g., a central station 150, which can include at least one processor and memory circuitry (PMC).

In some embodiments, the central station 150 can perform at least some of the tasks of PMC 110 located on the marine vessel 125.

The remote communication link can correspond e.g. to a broadband cellular network (e.g. 4G, 5G, LTE, etc.), a satellite communication network, radio communication network (such as Radio VHF-very high frequency), etc.

Data can be transmitted using a communication system located on the marine vessel 125 which is suitable to transmit data via the remote communication network. The communication system can include e.g., an antenna, an emitter, a transponder, etc.

As visible in FIG. 1, the processor of PMC 110 can be configured to implement a neural network (NN) 160. In some embodiments, the neural network 160 can be a deep neural network.

In particular, the processor can execute several computer-readable instructions implemented on a computer-readable memory comprised in the PMC, wherein execution of the computer-readable instructions enables data processing by the neural network. As explained hereinafter, NN 160 enables data processing of one or more images of one or more marine objects, for outputting distance information of the one or more marine objects.

By way of non-limiting example, the layers of NN 160 can be organized in accordance with Convolutional Neural Network (CNN) architecture, Recurrent Neural Network architecture, Recursive Neural Networks architecture, Generative Adversarial Network (GAN) architecture, or otherwise. In some embodiments, at least some of the layers can be organized in a plurality of DNN sub-networks. Each layer of the DNN can include multiple basic computational elements (CE), typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g., the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

System 100 can be used to perform one or more of the methods described hereinafter.

Figure 2A:
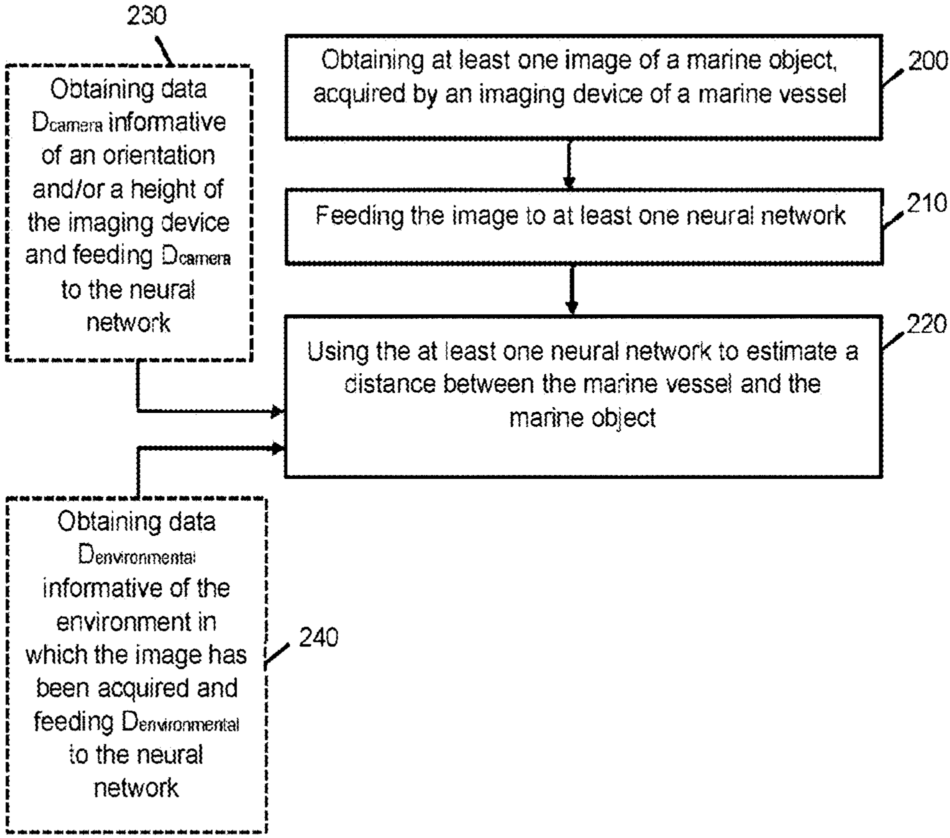
FIG. 2A illustrates an embodiment of a method of determining a distance to a marine object using an image acquired by an imaging device of a marine vessel.

Attention is now drawn to FIG. 2A.

The method includes obtaining (operation 200) at least one image of a marine object, acquired by an imaging device 120 of a marine vessel 125.

In some embodiments, the image can include a plurality of different marine objects.

The marine objects can include e.g., other marine vessels, icebergs, buoys, etc. The marine objects generally include at least a part which is located above sea level.

Figure 2B:
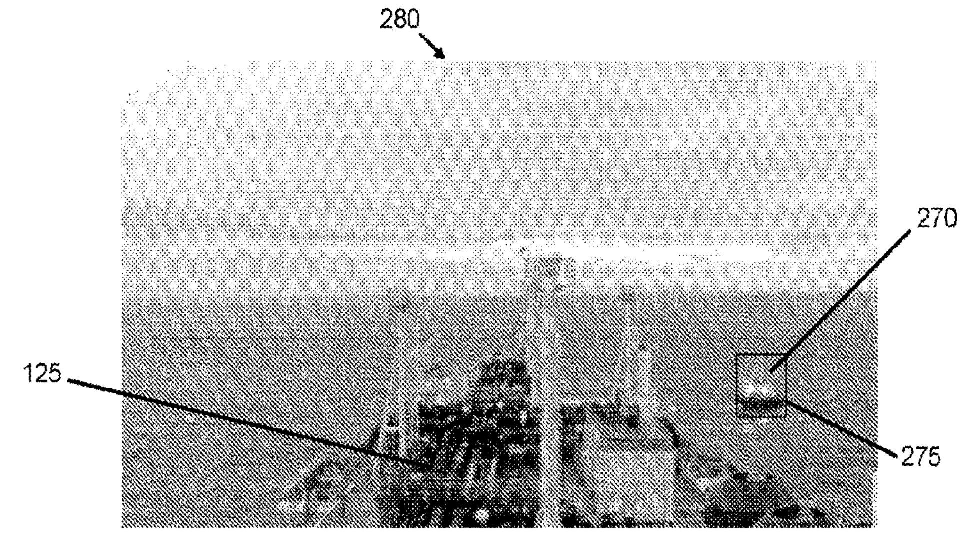
FIG. 2B illustrates an example of an image of a marine object acquired by the imaging device of a marine vessel.

A non-limitative example of an image 280 is illustrated in FIG. 2B, in which an imaging device (not visible in FIG. 2B) mounted on the marine vessel 125 has acquired an image of the marine object 270.

The method further includes feeding (operation 210) the image to the neural network 160.

According to some embodiments, the image is pre-processed before being fed to the neural network 160. In particular, a PMC (such as PMC 110) can execute an algorithm which is configured to detect, in the image acquired by the imaging device 120, marine objects present in the image.

This detection can rely e.g., on an image processing algorithm. In some embodiments, a machine learning module 159 (which implements e.g., a neural network, such as a deep neural network) is trained to detect marine objects present in images acquired by an imaging device of a marine vessel. In some embodiments, the machine learning network implemented in the machine learning module 159 can be distinct from the neural network 160, but this is not mandatory.

This training can include supervised learning in which a plurality of annotated images comprising marine objects are fed to the machine learning module. Each annotated image can include e.g., a bounding box provided by an operator who indicates the location of the marine object(s) in the image.

This is not limitative, and the training can also include automatic training and/or non-supervised learning.

In some embodiments, the machine learning module 159 can provide information on the type of the object (e.g., marine vessel, type of marine vessel, type of marine object such as an iceberg, etc.). This can be obtained by performing supervised learning of the machine learning module, in which labelled images comprising marine objects (together with their type, which corresponds to the label) are fed to the machine learning module 159 for its training.

The output of the identification of the marine object(s) in the image can include a geometric representation (e.g., a bounding box) indicative of the estimated location of each marine object(s) in the image. A non-limitative example is provided in FIG. 2B, in which the bounding box 275 surrounds the marine vessel 270 in the image 280.

In some embodiments, the neural network 160 can be trained to identify, by itself, the marine object(s) in the image(s) received from the imaging device 120 (or from another imaging device).

Figure 2C:
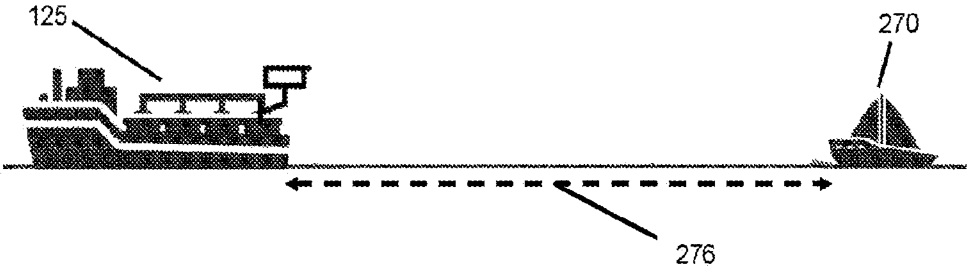
FIG. 2C illustrates a schematic representation of a distance between a marine vessel and a marine object.

As visible in FIG. 2A, the method further includes using (operation 220) the neural network 160 to estimate a distance between the marine vessel 125 and the marine object. An example of such a distance is depicted in FIG. 2C, which corresponds to the distance 276 between the marine vessel 125 and the marine object 270 (the distance can be expressed e.g., along a horizontal direction with a constant altitude, as depicted in FIG. 2C—this is however not limitative). If the sea level is considered as the X-Y plane, and the Z axis corresponds to the height from the sea level, the distance can be expressed e.g. between a point of the sea level located at the same X/Y coordinates as the imaging device 120 of the marine vessel 125 and the marine object 270. This is not limitative, and other conventions can be used.

In some embodiments, the distance is estimated from the marine vessel 125 and the centre of the geometric representation (e.g., bounding box) surrounding the marine object 270 in the image(s).

As explained hereinafter, the neural network 160 has been previously trained to be able to output, based on an image of a marine object, the estimated distance between a marine vessel (on which an imaging device acquiring the image is located) and the marine object.

According to some embodiments, the neural network 160 provides, in real time, or quasi real time after obtaining the image from the imaging device 120, an estimation of the distance between the marine vessel 125 and the marine object.

The distance determined by the neural network 160 can be output to a user (using e.g., a display device such as a screen) and/or can be provided to another system, such as an auto-pilot system of the marine vessel 125, which controls the trajectory of the marine vessel 125 over time using inter alia the estimated distance. The auto-pilot system can generate commands for actuators (e.g., motor(s), rudder(s)) to control the trajectory of the marine vessel 125. For example, if the distance to the marine object is below a threshold (which indicates that a collision may occur), the auto-pilot system can send a command to the actuators of the marine vessel 125 to change its trajectory, thereby avoiding a collision. This example is not limitative.

According to some embodiments, the neural network 160 is fed (in addition to the image of the marine object acquired by the imaging device 120 of the marine vessel 125) with data $D_{camera}$ informative of an orientation and/or of a height of the imaging device 120 within a period of time during which the image has been acquired (operation 230).

The neural network 160 can take into account data $D_{camera}$ to provide an estimation of the distance to the marine object.

This additional input can, in some embodiments, improve accuracy of the estimation of the distance between the marine vessel 125 and the marine object.

FIG. 2B illustrates an example in which the height of the imaging device 120 impacts the display of the marine object in the image.

Figure 2D:
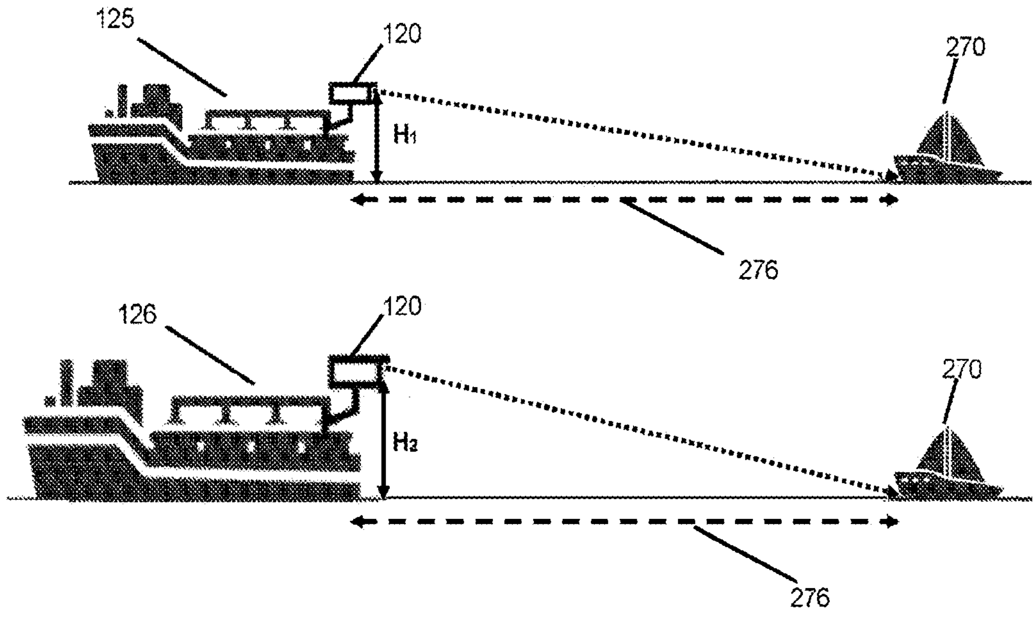
FIG. 2D illustrates a schematic representation of the influence of the height of the imaging device in estimating the distance between the marine vessel and the marine object.

In the two images of FIG. 2B, the distance 276 to the marine object 270 is the same. However, the height of the imaging device 120 is not the same. In the bottom part of FIG. 2D, the imaging device 120 is mounted on a ship 126 which is of greater size than the ship 125 illustrated in the upper part of FIG. 2D. Therefore, the height $H_2$ of the imaging device 120 on the ship 126 in larger than the height $H_1$ of the imaging device 120 on the ship 125.

This causes the same marine object 270 (located at the same distance) to appear differently in the images acquired by the imaging device 120, and can impact distance estimation, since distance estimation relies on the images of the imaging device 120.

In some embodiments, the neural network 160 can be fed with the height (and/or orientation) of the imaging device 120 within a period of time at which the image has been acquired, in order to prevent the height of the imaging device 120 to alter the distance estimation.

As explained hereinafter, in some embodiments, the estimated height (and/or orientation) can be fed to the neural network 160 during training of the neural network 160. The neural network 160 can therefore learn to predict the distance to the marine object although the height of the imaging device (and in turn the representation of the marine object in the images) can vary.

In some embodiments, the estimated height (and/or orientation) can be fed to the neural network 160 during the prediction phase (in which the neural network 160 estimates the distance to the marine object based on one or more images thereof).

Note that the height of the imaging device 120 can also vary over time for a given marine vessel, due to the variations in the wave height at sea, a change of the freight of the marine vessel, a change in the number of passengers of the marine vessel, etc. Estimation of the height of the imaging device 120 can be performed and can be used (as an input of the neural network 160) to prevent the change(s) in the height from altering the distance estimation.

In some embodiments, for each image acquired at time T, the corresponding estimation of the height (and/or orientation) of the imaging device 120 at time T (or at time $T_1$ close to T if there is a processing delay) is fed to the neural network 160.

Embodiments for determining $D_{camera}$ (which includes height and/orientation of the imaging device) will be provided hereinafter.

According to some embodiments, the neural network 160 is fed (in addition to the image of the marine object acquired by the imaging device 120 of the marine vessel 125) with data $D_{environmental}$ informative of the environment in which the image has been acquired (see operation 240).

The neural network 160 can take into account data $D_{environmental}$ to provide an estimation of the distance to the marine object.

This additional input can, in some embodiments, improve accuracy of the estimation of the distance between the marine vessel 125 and the marine object. $D_{environmental}$ can include e.g., data informative of the environmental conditions, e.g. whether it is day or night, and meteorological conditions (clear sky, foggy, cloudy, rainy, etc.).

$D_{environmental}$ can include data characterizing the environment in which the image has been acquired (e.g., whether the image has been acquired at a port, in a canal, near the shore, or at a far shore, etc.).

$D_{environmental}$ can be obtained using e.g., sensors of the marine vessel 125 and/or by data provided by third parties. For example, meteorological conditions can be measured using temperature sensor, pressure sensor, or can be provided by a third party. Data informative of the type of environment encountered by the marine vessel 125 can be determined using e.g., position of the marine vessel 125 (e.g., using GPS/AIS) and a map indicative of the type of environment at sea (which maps position of ports, etc.). These examples are not limitative.

Note that the environment in which the image has been acquired (such as the meteorological conditions) affect the estimation process of the distance. Indeed, the visibility of the marine object in the images is not the same depending on the environmental conditions. It is more challenging to determine the distance to the marine object at low visibility (e.g., at night and/or in presence of fog) than at high visibility (e.g. during day time in open sea). Usage of the data $D_{environmental}$ (in prediction and/or during training) is helpful to enable the neural network 160 to estimate the distance to the marine object even in difficult environmental conditions.

According to some embodiments, the neural network 160 can determine, for a given image, a plurality of candidate distances between the marine vessel 125 and the marine object. For each candidate distance, the neural network 160 can provide a probability that the candidate distance is a correct estimate of the distance between the marine vessel and the marine object.

Figure 2E:
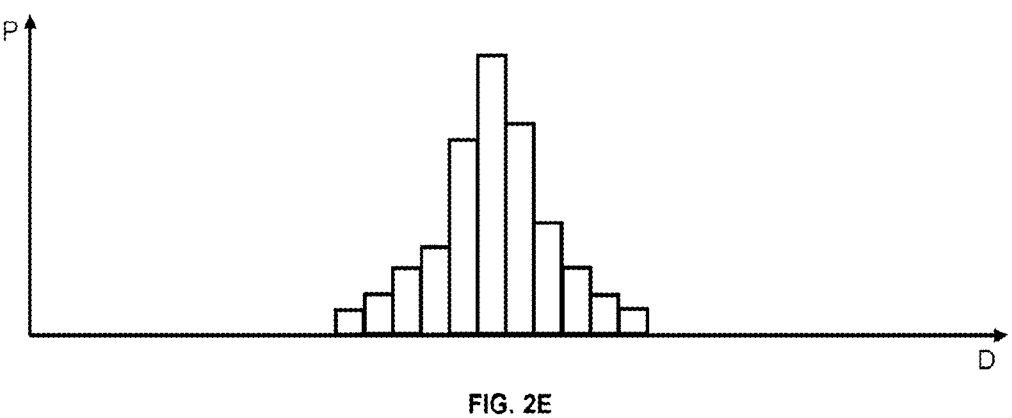
FIG. 2E illustrates an example of a distribution of candidate distances estimated by a neural network.

A non-limitative example is depicted in FIG. 2E, in which, for each candidate distance (the X-axis of the graph corresponds to the estimation of the distance value D between the marine vessel 125 and the marine object), a probability (the Y-axis of the graph corresponds to the probability P associated with each distance value) is provided. The higher the value of P, the higher the probability that the corresponding distance value is correct according to the neural network 160.

In some embodiments, the distance output by the neural network 160 can be selected as the candidate distance with the highest probability. This is not limitative. In some embodiments, a statistical analysis can be performed on the probability distribution of the candidate distances. The statistical analysis includes e.g., one sigma, two sigma, etc. (or other statistical methods).

Note that the method of FIG. 2A can be performed in parallel for a plurality of different marine objects. Assume for example that a plurality of N different marine objects is present in the image. The pixel position of each marine object can be identified in the image (as explained above). The image (together with the position of each marine object in the image) can be fed to the neural network 160 which outputs, for each given marine object, an estimate of the distance from the marine vessel 125 to the given marine object.

According to some embodiments, it is possible to feed additional data to the neural network 160 to enable distance estimation, such as the type of the marine object. The type of the marine object can be deduced from the image using image processing algorithms, or using information provided by another sensor.

As can be understood from the method of FIG. 2A, according to some embodiments, it is possible to determine the distance to the marine object using data acquired by the imaging device, without using data informative of the marine object acquired by a sensor (e.g., AIS, radar, etc.) different from the imaging device. In some embodiments, the distance to the marine object can be determined using only data acquired by the imaging device.

According to some embodiments, the neural network 160 is fed with one or more images of a given marine object. All of the one or more images provided to the neural network 160 have been acquired by the same single imaging device of the marine vessel (note that this does not preclude the marine vessel to embed other imaging devices) and the neural network 160 determines the distance to the marine object using these images. In other words, this enables to determine distance to the marine object using a single camera of a marine vessel.

Figures 3A, 3B:
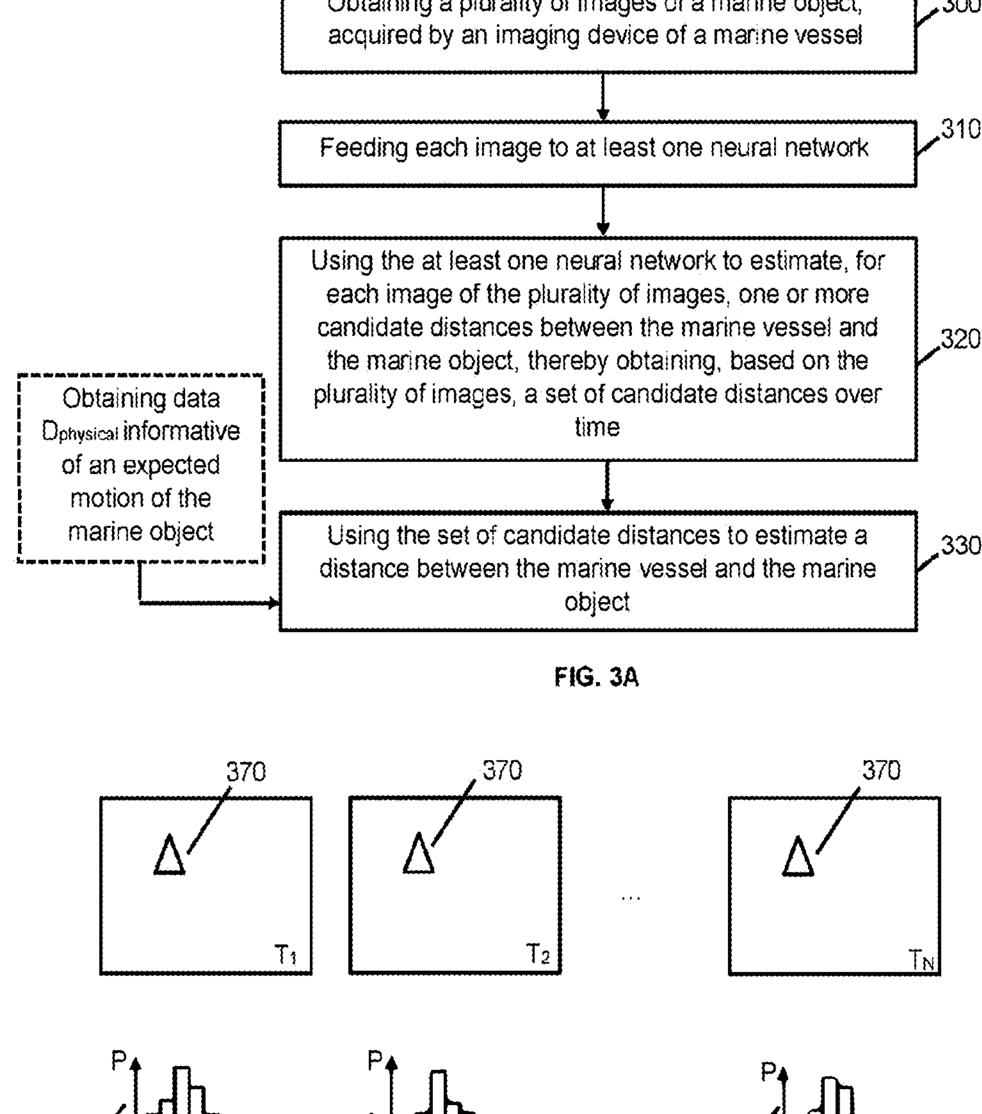
FIG. 3A illustrates an embodiment of a method of determining a distance to a marine object using a plurality of images acquired by an imaging device of a marine vessel.
FIG. 3B illustrates an example of a plurality of distributions of candidate distances estimated by a neural network over time.
Figure 3C:
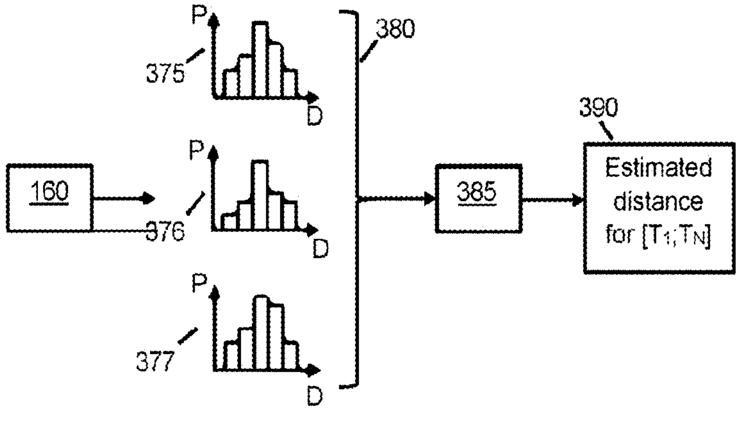
FIG. 3C illustrates an embodiment of a system which uses the plurality of distributions of candidate distances estimated by a neural network over time to determine the candidate distance.

Attention is now drawn to FIG. 3A.

The method of FIG. 3A includes obtaining (operation 300) a plurality of images (a sequence of images) of a marine object, acquired by the imaging device at different periods of time.

The method further includes feeding (operation 310) each image of the plurality of images to the neural network 160. The images can be e.g., fed sequentially to the neural network 160, one after the other. Alternatively, they can be fed simultaneously to the neural network 160.

According to some embodiments, the time interval between the acquisition of the first image and acquisition of the last image of the sequence of images is below a threshold. For example, the first image is acquired at time $T_1$, the second image is acquired at time $T_2>T_1$, and the last image is acquired at time $T_N$, with $|T_N-T_1|$<threshold.

In some embodiments, the threshold can be chosen such as the displacement of the marine object with respect to the marine vessel 125 between the different images is negligible. In this case, the threshold depends on the relative position of the marine object. If the marine object is located near the horizon line, the threshold can be up to one minute, and if the marine object is located close to the bottom of the image, the threshold can be up to one second. Note that these values are not limitative.

As explained above, the marine object can be identified in each image using for example the machine learning module 159. A tracking method can be used to track the marine object over the different images. The tracking method can be implemented by a PMC, such as PMC 110. The tracking method can use e.g., a Kalman filter, or other adapted tracking methods can be used. The tracking method enables to understand the motion of each marine object over the plurality of images.

The method further includes using (operation 320) the neural network 160 to estimate, for each image of the plurality of images, one or more candidate distances between the marine vessel 125 and the marine object. Since this operation is repeated for each image (acquired at different periods of time), a set of candidate distances over time is obtained.

For example, as illustrated in FIG. 3B, for the image of the marine object 370 acquired at $T_1$, the distribution 375 of candidate distances is obtained (each candidate distance being associated with a probability), for the image of the marine object 370 acquired at $T_2$, the distribution 376 of candidate distances is obtained (each candidate distance being associated with a probability), and for the image of the marine object 370 acquired at $T_N$, the distribution 377 of candidate distances is obtained.

The set 380 of candidate distances is therefore obtained (which can include all or at least part of the candidate distances determined in the given period of time ($[T_1;T_N]$)). The set 380 of candidate distances can be used to estimate a distance between the marine vessel and the marine object within the given period of time ($[T_1;T_N]$).

In some embodiments, the set 380 of candidate distances can include e.g., only the candidate distances of the distributions 375, 376 and 377 which have a probability higher than a threshold. This is however not limitative, and the set 380 of candidate distances can include all candidate distances of the various distributions 375, 376 and 377.

In some embodiments, a state estimator 385 implemented by the PMC 110, such as a Kalman filter, a deep neural network, a high pass or low pass filter, can be fed with the set 380 of candidate distances. The state estimator 385 can use the set 380 of candidate distances to output an estimate 390 of the distance between the marine vessel 125 and the marine object within the given period of time ($[T_1;T_N]$). The state estimator 385 can for example smoothen the distance estimation over time (e.g., by filtering sudden variations in the distance estimation).

In other embodiments, the neural network 160 is operative to handle time series data. For example, a recurrent neural network, a LSTM (Long short-term memory (LSTM)), or other adapted neural networks can be used to determine distance to the marine object over time, using the sequence of images acquired at different periods of time.

Figure 3D:
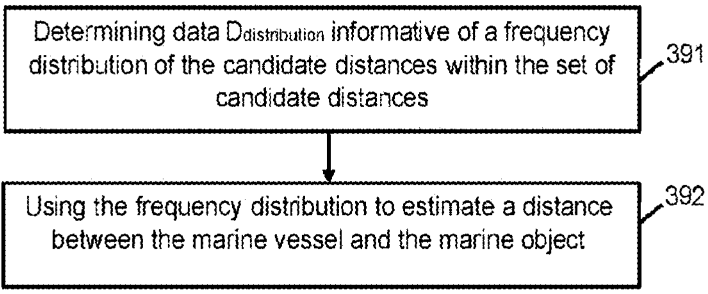
FIG. 3D illustrates an embodiment of a method of determining a frequency distribution within a set of candidate distances to estimate the candidate distance.

According to some embodiments, the method includes determining (operation 391 in FIG. 3D) data $D_{distribution}$ informative of a frequency distribution of the candidate distances within the set 380 of candidate distances. Indeed, each candidate distance $D_i$ can be present $M_i$ times (with $M_i$ equal to or greater than one) within the set 380 of candidate distances. For example, assume that the neural network 160 has estimated that the distance between the marine vessel and the given marine object is $D_1$ at time $T_1$, and that the distance between the marine vessel and the given marine object is again $D_1$ at time $T_J$ (with J different from 1). As a consequence, the distance $D_1$ appears twice within the set 380 of candidate distances ($M_1$ is equal to 2). Assume that the set 380 of candidate distances include K different candidate distances. The frequency distribution (also called occurrence) of each candidate distance $D_i$ can be for example defined as $M_i/K$.

The frequency distribution of the candidate distances can be used to estimate the distance between the marine vessel 125 and the marine object (operation 392).

In some embodiments, the candidate distance which has the highest frequency distribution can be selected as the estimation of the distance between the marine vessel and the marine object. This is not limitative and candidate distances obtained with different frequencies (which do not necessarily correspond only to the highest frequency) can be output.

The method can be repeated for a different period of time $[T_{N+1}; T_M]$.

According to some embodiments, it is possible to use data $D_{physical}$ informative of an expected motion of the marine object, in order to determine the distance to the marine vessel.

Assume that the neural network 160 has been used to estimate, for each image of a plurality of images, one or more candidate distances between the marine vessel and the marine object, thereby obtaining, based on the plurality of images, a set of candidate distances for the given period of time.

Data $D_{physical}$ can be used to determine that at least one candidate distance of the set of candidate distances is not compatible with a (realistic/correct) estimate of a distance between the marine vessel and the marine object.

Indeed, if it is known that the marine object has a speed which cannot exceed a threshold, then the difference between a candidate distance determined for an image at a first time and a candidate distance determined at a second time cannot exceed a given threshold, and therefore this can be used to filter erroneous/unrealistic candidate distances.

Figure 4:
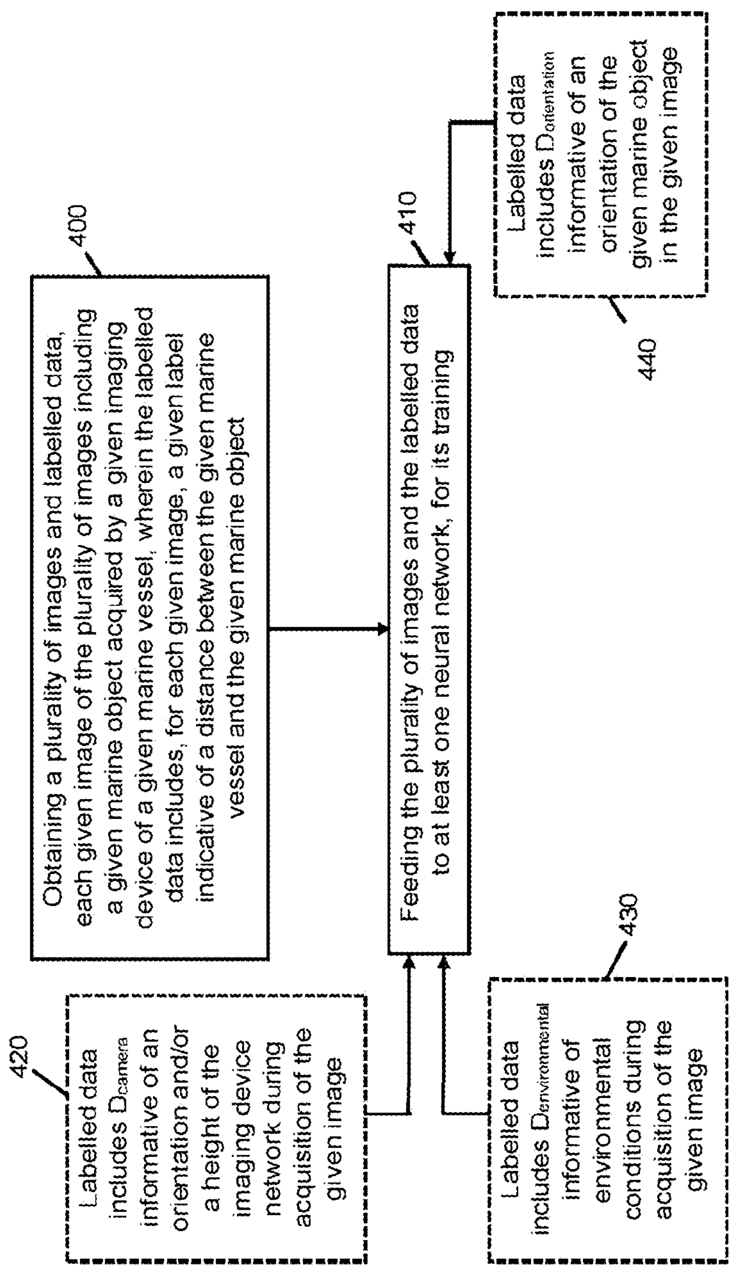
FIG. 4 illustrates an embodiment of a method of training a neural network to estimate a distance to a marine object using an image acquired by an imaging device of a marine vessel.

Attention is now drawn to FIG. 4, which describes a method of training the at least one neural network 160.

The method includes obtaining (operation 400) a plurality of images (training set) and labelled data. Each given image of the plurality of images includes a given marine object (or a plurality of image marine objects) acquired by a given imaging device of a given marine vessel. Note that in the training set, the marine objects can be different from one image to another. In some embodiments, the images can be acquired by imaging devices mounted on different marine vessels. In some embodiments, the images can be acquired by imaging devices of different types and/or with a different height and/or with a different orientation, etc.

The labelled data includes, for each given image of the training set, a given label indicative of a distance between the given marine vessel and the given marine object. Embodiments for generating the labelled data are provided hereinafter.

According to some embodiments, the labelled data includes, for each given image, a geometric representation (e.g., bounding box) indicative of the position of the given marine object in the given image. This position in the image can be determined for example by the machine learning module 159, or using different methods.

The method further includes feeding (operation 410) the plurality of images and the labelled data to the at least one neural network 160, for its training.

The neural network 160 tries to predict the distance to the marine object, and a comparison of this prediction with the distance provided in the labelled data can be used to update weights associated with neurons of the layers of the neural network 160. Methods such as Backpropagation can be used to train the neural network 160.

The weighting and/or threshold values of the neural network 160 can be initially selected prior to training and can be further iteratively adjusted or modified during training to achieve an optimal set of weighting and/or threshold values in a trained neural network. After each iteration, a difference (also called loss function) can be determined between the actual output produced by the neural network 160 and the target output (e.g., the distance provided in the label) associated with the respective training set of data. The difference can be referred to as an error value. Training can be determined to be complete when a cost or loss function indicative of the error value is less than a predetermined value, or when a limited change in performance between iterations is achieved. If the neural network 160 includes a plurality of NN subnetworks, they can be trained separately, prior to training the entire NN.

According to some embodiments, the labelled data that are fed to the neural network 160 for its training include, for each given image of the training set, data $D_{camera}$ informative of an orientation and/or of a height of the imaging device 120 within a period of time at which the given image has been acquired (operation 430).

As explained above with reference to FIG. 2D, providing the height of the imaging device 120 to the neural network 160 during its training can help the neural network 160 to be adaptive to any height of the imaging device. Robustness of the distance prediction is therefore improved.

Embodiments for determining $D_{camera}$ will be provided hereinafter.

According to some embodiments, the labelled data includes, for each given image of the training set (or for at least some of them), data $D_{environmental}$ informative of the environment in which the image has been acquired. Note that examples of data for $D_{environmental}$ have been provided above, as well as non-limitative embodiments to obtain this data, and this description applies hereinafter.

Therefore, $D_{environmental}$ can be also fed to the neural network 160 as an input for its training.

According to some embodiments, it is possible to feed additional data to the neural network 160 for its training, such as the type of the marine object. The type of the marine object can be provided with the labelled image. Embodiments for determining, automatically, the type of the marine object, are provided hereinafter.

According to some embodiments, the neural network 160 is trained using a set of images and labelled data, each given image of the set of images including a given marine object acquired by a given imaging device of a given marine vessel, wherein the labelled data includes data 440 (see FIG. 4) informative of an orientation of the given marine object as displayed in the given image.

A non-limitative example is provided in FIG. 5.

In the left part of FIG. 5, the marine vessel 520 is travelling towards the marine vessel on which the imaging device acquiring the image 530 is mounted.

In the right part of FIG. 5, the same marine vessel 520 is travelling along a trajectory orthogonal to an optical axis of the imaging device acquiring the image 540.

As visible from the example of FIG. 5, the size and the dimensions of the marine vessel are not the same depending on its orientation in the image. This can impact the distance estimation performed by the neural network 160.

Therefore, in some embodiments, data 440 informative of the orientation of the marine object in the image is fed to the neural network 160. This can help improving accuracy of the distance estimation when training the neural network 160.

In some embodiments, data 440 informative of the orientation of the marine object can be determined using the AIS of the marine object (which provides the position and the course of the marine object) and the position of the marine vessel (which is known using sensors of the marine vessel) on which the imaging device is mounted. Based on these data, it is possible to estimate the trajectory of the marine object relative to the marine vessel, and, in turn, the orientation of the marine object in the images acquired by the imaging device of the marine vessel.

In some embodiments, data 440 can be used also during prediction, that is to say that data 440 can be fed to the trained neural network 160 (in addition to the image of a marine object acquired by the imaging vessel) to improve the estimation of the distance to the marine object by the trained neural network 160. This is however not mandatory.

In some embodiments, the neural network 160 is trained using images acquired by one or more imaging devices of one or more marine vessels which are not necessarily the same as the marine vessel which is used to acquire images during the prediction phase.

Attention is now drawn to FIG. 6A.

Assume that the neural network 160 has been used to determine a distance from the marine vessel 125 to a given marine object. In some embodiments, performance of the neural network in this distance estimation can be assessed (operation 610). In particular, it can be determined that the estimation of the distance by the neural network 160 does not meet a quality criterion.

Operation 610 can include e.g., comparing the distance output by the neural network to the true distance (the true distance can be provided e.g., using other sensors, such as AIS). If the difference is above a threshold, this indicates that the estimation does not meet the quality criterion. In a non-limitative example, the threshold is around 200m (this value is not limitative). Note that the threshold can vary depending on the distance to the marine object.

Operation 610 can include checking the level of confidence of the neural network 160 in its estimation. Indeed, in some embodiments, the neural network 160 can provide a level of confidence (or probability) that its output is correct. If the level of confidence is below a threshold, this indicates that the estimation does not meet the quality criterion.

Operation 610 can include analysing the distribution of candidate distances. This distribution should tend to a Gaussian curve (this is not limitative). However, a distribution in which the candidate distances have similar probabilities is indicative of the fact that the neural network 160 did not manage to estimate the correct distance (see a non-limitative example of such distribution 600 as illustrated in FIG. 6B). This indicates that the estimation does not meet the quality criterion. In other words, the distribution of candidate distances does not meet a criterion (e.g., does not match a Gaussian curve), and therefore, as explained hereinafter, the neural network 160 should be retrained.

If estimation of the distance by the neural network 160 does not meet the quality criterion, the method of FIG. 6A can further include determining (operation 620) a scenario in which the image has been acquired. Note that the scenario can be also determined based on a plurality of images of one or more marines objects for which the neural network tends to underperform in its distance estimation.

In some embodiments, it can be determined that the image has been acquired under given environmental conditions. This can be determined using e.g. the data $D_{environmental}$. For example, it can be determined that the distance estimation by the neural network 160 tends to underperform in a rainy day.

In some embodiments, it can be determined that the image which has been acquired is the image of a given type of marine object. For example, it can be determined that the distance estimation by the neural network 160 tends to underperform for fishing vessels.

In some embodiments, it can be determined that the image which has been acquired corresponds to a specific location at sea (e.g., at shore), or specific background in the image (e.g., at shore and not in open sea).

In some embodiments, it can be determined that the image which has been acquired corresponds to a specific height or range of heights of the imaging device.

In some embodiments, it can be determined that the image has been acquired at a given distance or range of distances. For example, it can be determined that the distance estimation by the neural network 160 at a distance above 5 miles tends to underperform.

In some embodiments, it can be determined that the image has been acquired for a specific orientation of the one or more marine objects as displayed in the given images. For example, it can be determined that the distance estimation by the neural network 160 tends to underperform for marine objects which travel towards the marine vessel.

In other words, this indicates that for a given scenario, the deep neural network 160 tends to underperform, and should therefore be retrained specifically for this type of given scenario.

The method of FIG. 6A can further include retraining (operation 630) the neural network with a training set which matches the scenario according to a matching criterion.

For example, if it has been determined that the image has been acquired on a rainy day, a training set including images acquired on a rainy day can be used.

Alternatively, if it has been determined that the image has been acquired at long distance of the marine object (e.g., over 5 miles), then the training set includes images of marine objects located at a distance greater than 5 miles.

In other words, a retraining of the neural network is performed which focuses on the scenario/types of input data in which the neural network tends to underperform.

For example, it has been detected that the neural network 160 tends to underperform in distance estimation for fishing vessels located at shore at a distance over 5 miles (this example is not limitative). A training set of images corresponding to this scenario can be obtained and fed to the neural network 160 for retraining the neural network 160, thereby enabling the neural network 160 to improve its performance in the scenario in which it tends to underperform.

Note that in some embodiments, it is possible to generate detailed benchmarks for analyzing the performance of the neural network 160. For each of a plurality of given scenarios, the distance estimation of the neural network 160 is assessed to verify whether it meets the quality criterion. If, for a given scenario, it has been established that the quality criterion, the neural network 160 can be retrained using images which have been acquired under conditions corresponding specifically to this given scenario.

Figures 7, 7A:
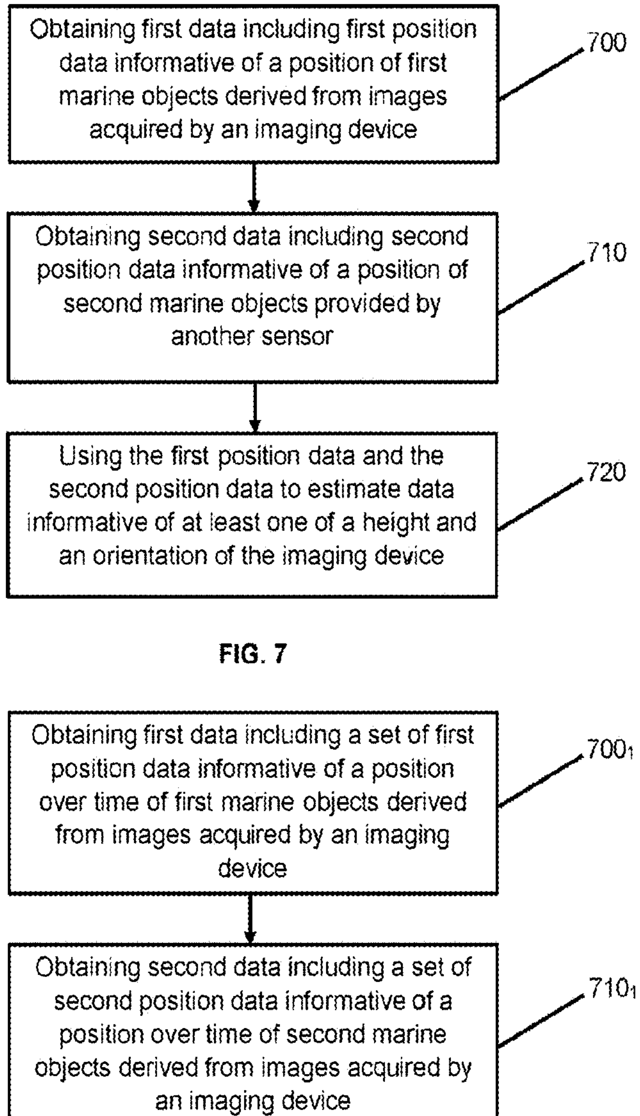
FIG. 7 illustrates an embodiment of a method of determining data informative of a height and/or orientation of an imaging device of a marine vessel.
FIG. 7A illustrates a variant of the method of FIG. 7.

Attention is now drawn to FIG. 7, which describes a method of determining data $D_{camera}$ informative of a height and/or orientation of an imaging device. As explained hereinafter, this method can be used also to generate automatic labelling of images of marine objects (the label including the distance to the marine object).

As shown in FIG. 7, the method includes obtaining (operation 700) first data informative of first marine objects.

The first data is obtained based on images acquired by the imaging device 120 of the marine vessel 125. In some embodiments, the first data is obtained based on images acquired by a plurality of imaging devices 120 of the marine vessel 125. The first data includes first position data informative of a position of first marine objects.

Generally, the first position data is expressed in the referential of the imaging device 120. A PMC is configured to detect, in a given image acquired by the imaging device 120, marine objects present in the image. As mentioned above, this detection can rely on an image processing algorithm.

Once a given marine object is detected in an image acquired by the imaging device 120, its position (e.g., pixel position comprising a position along the X axis of the image and a position along the Y axis of the image) in the image can be obtained. Therefore, for each marine object acquired by the imaging device 120, a position in the image can be obtained. The first position data can include, in some embodiments, the position of each given object of the first marine objects in the image in which the given object has been detected.

According to some embodiments, the imaging device 120 acquires a plurality of images at a plurality of periods of time. As a consequence, it is possible to obtain position over time of the first marine objects.

In particular, the method can include obtaining a set of first position data (see operation 7001 in FIG. 2A). The set of first position data includes, for each object of the first marine objects, position of the object at the plurality of periods of time.

Indeed, since the marine vessel 125 moves over time and/or at least some of the first marine objects move over time, the position of the first marine objects in the images acquired by the imaging device 120 can change over time.

According to some embodiments, in order to generate the set of first position data, it is possible to track the first marine objects in the plurality of images acquired by the imaging device 120.

Figure 7B:
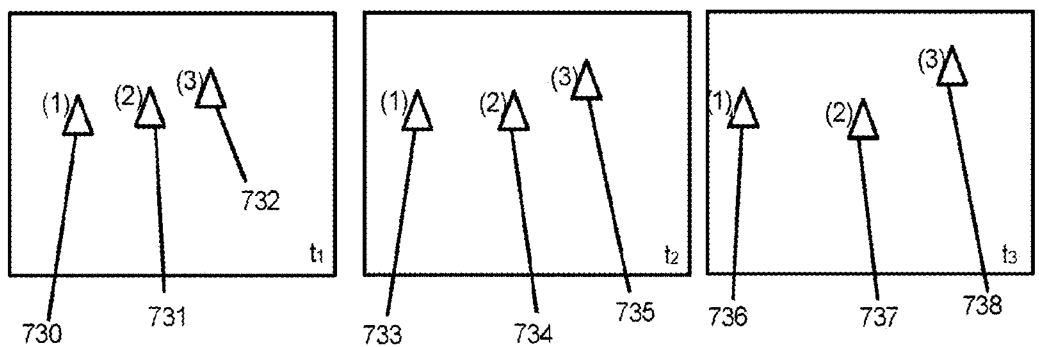
FIG. 7B illustrates an example of tracking marine objects over a plurality of images acquired by an imaging device of a marine vessel.

A non-limitative example is provided with reference to FIG. 7B.

Assume that at time $t_i$, an image is acquired by the imaging device 120. In this image, three marine objects are detected. A first marine object is located at position 730, a second marine object is located at position 731, and a third marine object is located at position 732.

At time $t_2$ (different from $t_1$), another image is acquired by the imaging device 120. In this image, three marine objects are detected. A first marine object is located at position 733, a second marine object is located at position 734, and a third marine object is located at position 735.

At time $t_3$ (different from $t_2$), another image is acquired by the imaging device 120. In this image, three marine objects are detected. A first marine object is located at position 736, a second marine object is located at position 737, and a third marine object is located at position 738.

A tracking method can be used to track the various marine objects over the different images. The tracking method can be implemented by a PMC. The tracking method can implement e.g., a Kalman filter, or other adapted tracking methods.

In some embodiments, it can appear that a marine object is present in some of the images and disappear in subsequent images. This can be due to the relative motion between the marine object and the marine vessel 125.

In the example of FIG. 7B, the tracking method reveals that the marine object located at position 730 at time $t_1$, the marine object located at position 733 at time $t_2$ and the marine object located at position 736 at time $t_3$ correspond to the same object at different periods of time. Therefore, the same tracking ID (in this example "(1)") can be assigned to indicate that the same marine object is present at different positions in the different images.

Similarly, the tracking method reveals that the marine object located at position 731 at time $t_1$, the marine object located at position 734 at time $t_2$ and the marine object located at position 737 at time $t_3$ correspond to the same marine object at different periods of time. Therefore, the same tracking ID (in this example "(2)") can be assigned.

Similarly, the tracking method reveals that the marine object located at position 732 at time $t_1$, the marine object located at position 735 at time $t_2$ and the marine object located at position 738 at time $t_3$ correspond to the same marine object. Therefore, the same tracking ID (in this example "(3)") can be assigned.

The method includes obtaining (710) second data informative of second marine objects.

Although FIG. 7 depicts a sequence in which the first position data is first obtained and then the second position data, this is not mandatory, and this can be performed in the opposite way, or simultaneously. This is also true for the sequence depicted in FIG. 7A.

The second data is obtained based on data acquired by at least one sensor 115 of the marine vessel 125. Sensor 115 is different from imaging device 120. In some embodiments, sensor 115 is not an imaging device (e.g., not a camera). Various examples have been provided above for sensor 115 (e.g., a radar, AIS, etc.).

The second data includes second position data informative of a position of second marine objects encountered by the marine vessel 125 during its voyage. As explained hereinafter, according to some embodiments, the method projects position of the targets detected by the various sensors (which can be expressed in different referentials) within a common referential.

In some embodiments, a plurality of sensors 115 is available, which includes sensors 115 of different types (e.g., a first sensor is a radar, a second sensor is AIS, a third sensor is GPS, etc.). In this case, for each sensor, position data of marine objects detected by this sensor is obtained. As explained hereinafter, each sensor can detect different marine objects, but at least a plurality of the marine objects surrounding the marine vessel 125 is detected by different sensors 115.

At least some of the first marine objects and the second marine objects correspond to the same physical marine objects. For example, the first marine objects include a first given marine vessel, a second given marine vessel, and a buoy. The second marine objects include the first given marine vessel, the second given marine vessel, and an iceberg.

This difference between the first marine objects and the second marine objects can be due to the fact that the imaging device 120 and the other sensors 115 have a different field of view, and/or a different line of sight, and/or different capabilities of detecting objects (e.g., depending on the type of the sensor, its capability to detect objects can depend e.g. on weather conditions, size of the object, type of the object, etc.). In addition, the imaging device 120 and the other sensor(s) 115 can present other differences (for example, the imaging device 120 can be used to classify marine objects, which is not possible for all sensors 115, such as radar).

Distance between the marine vessel 125 and the marine objects can also impact the detection of the marine objects by the sensors of the marine vessel 125. For example, a radar is operative to detect marine objects at medium-long range, but has a blind zone at short range, whereas the imaging device 120 better performs at short range than at long range for detecting marine objects. Therefore, not all marine objects are detected by all sensors of the marine vessel 125.

In some embodiments, the first marine objects and the second marine objects are the same. This means that all sensors 130 have been able to detect the same marine objects.

The second position data is expressed in a referential which can depend on the sensor 115.

For example, if sensor 115 is an AIS, absolute position (latitude, longitude in world coordinates) of the marine objects is obtained.

If sensor 115 is a radar, position of the marine object relative to the marine vessel 125 is obtained (expressed e.g., as a range and an angular position relative to the radar and/or marine vessel 125).

According to some embodiments, the second data can include additional data (in addition to the second position data of the second marine objects).

According to some embodiments, the second data includes identification data of the second marine objects. For example, the AIS provides identification data specific to each object, which enables its identification.

According to some embodiments, the second data includes data informative of the type (e.g., type of marine vessel, etc.) of the marine object (which can be provided by sensor(s) 115 and/or which can be derived from data provided by sensor(s) 115).

For example, the AIS can provide type of the marine object.

According to some embodiments, sensor 115 acquires data at a plurality of periods of time (e.g., while the marine vessel 125 is in motion). As a consequence, it is possible to obtain position over time of the second marine objects. As explained hereinafter, tracking data of the marine objects can be used to improve matching/association between the first and second marine objects. This is however not mandatory.

In particular, the method can include obtaining a set of second position data (operation 710$_1$ in FIG. 7A). The set of second position data includes, for each given object of the second marine objects, position of the given object at the plurality of periods of time.

In order to track the second marine objects over the different acquisitions, several methods can be used.

In some embodiments, if sensor 115 provides identification data specific to each object, it is possible to track the object over the plurality of periods of time, thereby enabling generating the set of second position data. For example, if sensor 115 is an AIS, it is possible to track the position of the objects over time, since each object is associated with specific identification data provided by the AIS.

If sensor 115 is a radar, the objects can be tracked over the various radar acquisitions (that is to say, at the plurality of periods of time), using regular radar tracking.

According to some embodiments, the first position data informative of a position of first marine objects (respectively, the set of first position data) corresponds to a position at a first period of time (respectively, at a plurality of first periods of time), and the second data informative of a position of second marine objects (respectively, the set of first position data) corresponds to a position at a second period of time (respectively, at a plurality of second periods of time).

The first period of time (respectively first periods of time) and the second period of time (respectively second periods of time) meet a synchronization criterion. The synchronization criterion ensures that the time difference between the respective first period(s) of time and the respective second period(s) of time is below a threshold. For example, the synchronization criterion can ensure that a time difference between the respective first period(s) of time and the respective second period(s) of time is below 1 sec. This value is however not limitative. In particular, if the respective first period(s) of time and the respective second period(s) of time do not meet the synchronization criterion, it possible to perform up-sampling of the data provided by the sensors (using e.g., a Kalman filter—this is not limitative). Similarly, if necessary, down-sampling can be performed.

As a consequence, the first period(s) of time and the second period(s) of time are substantially identical.

The method further includes (operation 720) using the first position data and the second position data to estimate data informative of at least one of a height and an orientation of the imaging device 120. In some embodiments, both data informative of a height and an orientation of the imaging device is estimated, or only part of this data (e.g., because at least some of this data is already known, using e.g., other sensors and/or external input). Generally, at least one of the height and the orientation of the at least one imaging device is variable over time, since orientation and/or position of the marine vessel evolves over time.

Data informative of an orientation of the imaging device 120 includes at least one of a roll of the imaging device 120, a pitch of the imaging device 120, a yaw of the imaging device 120, etc. This orientation can be expressed similarly as roll/pitch/yaw of a ship (for example, the roll axis is an imaginary line running horizontally through the length of the ship, through its centre of mass, and parallel to the waterline, the pitch axis is an imaginary line running horizontally across the ship and through its centre of mass, and the yaw axis is an imaginary line running vertically through the ship and through its centre of mass).

Data informative of a height (also called altitude or elevation) of the imaging device 120 can be also estimated. Height of the imaging device 120 can be expressed for example relative to sea level (also called mean sea level-MSL, or relative to still-water level-SWL).

Once one or more parameters of the imaging device 120 have been determined, additional position data (e.g., absolute position of the imaging device) can be determined.

As mentioned above, in some embodiments, position data of the marine objects at a plurality of periods of time is obtained.

According to some embodiments, the method can include using (operation 720$_1$ in FIG. 2A) the set of first position data (which includes position of the first marine objects at a plurality of periods of time derived from images acquired by the imaging device 120) and the set of second position data (which includes position of the second marine objects at a plurality of periods of time derived from data acquired by sensor 115) to estimate data informative of at least one of a position and an orientation of the imaging device 120 over time.

As explained hereinafter, estimating data informative of height and/or orientation of the imaging device 120 can include attempting to match position of the first marine objects and position of the second marine objects (in order to reflect the fact that they correspond to the same marine objects acquired by different sensors), by modifying the value of the height and/or orientation of the imaging device 120 (which is to be estimated). In other words, estimation of the height and/or orientation of the imaging device 120 also enables to match various targets acquired by the image and one or more additional sensors.

According to some embodiments, a filter (e.g., probabilistic filter) can be used which predicts the expected variations in orientation and/or height of the imaging device 120 (depending e.g., on the weather conditions). This is useful to filter out estimation of the height and/or orientation of the imaging device 120 which is not realistic and corresponds to noise.

Figure 7C:
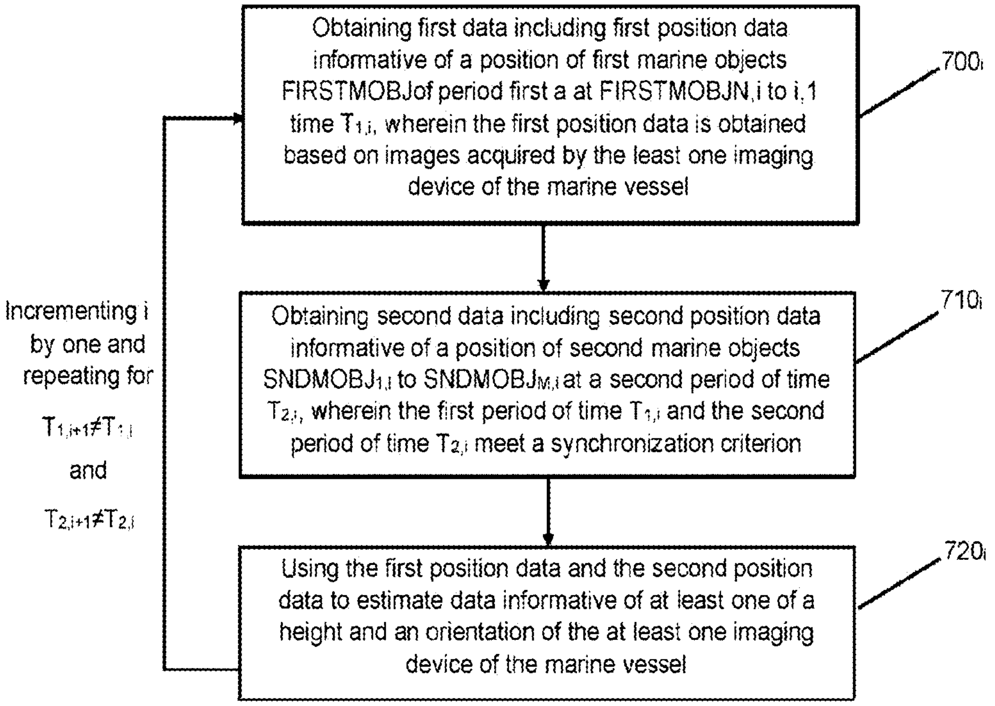
FIG. 7C illustrates a method of determining data informative of a height and/or orientation of an imaging device of a marine vessel over time.

FIG. 7C illustrates a method in which data informative of at least one of a height and an orientation of the imaging device 120 of the marine vessel 125 is estimated over time. As shown in FIG. 7C, the method is iterative over time.

The method includes obtaining (operation 700$_i$) first position data informative of a position of first marine objects $FIRSTMOBJ_{1,i}$ to $FIRSTMOBJ_{M,i}$ at a first period of time $T_{2,i}$, wherein the first position data is obtained based on images acquired by the imaging device 120 of the marine vessel 125. Operation 700; is similar to operation 200.

The method includes obtaining (operation 710*i*) second position data informative of a position of second marine objects $SNDMOBJ_{1,i}$ to $SNDMOBJ_{M,i}$ at a second period of time $T_{2,i}$, wherein the first period of time $T_{1,i}$ and the second period of time $T_{2,i}$ meet a synchronization criterion (see above a possible definition of this criterion). The second position data is obtained based on data acquired by the at least one sensor 115 of the marine vessel 125. Operation $210_i$ is similar to operation 210.

At least some of the first marine objects $FIRSTMOBJ_{1,i}$ to $FIRSTMOBJ_{N,i}$ are the same as at least some of the second marine objects $SNDMOBJ_{1,i}$ to $SNDMOBJ_{M,i}$.

The method includes (operation $720_i$) using the first position data and the second position data to estimate data informative of at least one of a height and an orientation of the imaging device 120 of the marine vessel 125. Operation $220_i$ is similar to operation 220. As a consequence, data informative of at least one of a height and an orientation of the imaging device 120 is estimated at a given period of time $T'_i$, which substantially coincides with the first period of time $T_{1,i}$ and the second period of time $T_{2,i}$ (as mentioned, the first period of time $T_{1,i}$ and the second period of time substantially $T_{2,i}$ coincide since they meet a synchronization criterion). In other words, $T'_i \sim T_{1,i} \sim T_{2,i}$.

As shown in FIG. 2C, operation 700; is repeated at a different first period of time $T_{1,i+1}$ (which occurs after $T_{1,i}$-i has been incremented by one in the flow chart of FIG. 2C). Therefore, at time $T_{1,i+1}$, first position data informative of a position of first marine objects $FIRSTMOBJ_{1,i+1}$ to $FIRSTMOBJ_{N,i+1}$ is obtained. It has to be noted that the first marine objects $FIRSTMOBJ_{1,i+1}$ to $FIRSTMOBJ_{N,i+1}$ of time $T_{i+1}$ can differ from the first marine objects $FIRSTMOBJ_{1,i}$ to $FIRSTMOBJ_{N,i}$ of time $T_i$. This is however not mandatory, and depends on the scenario (in some cases, there is a partial overlap).

Operation $710_i$ is repeated at a different second period of time $T_{2,i+1}$ (which occurs after $T_{2,i}$). Therefore, at time $T_{2,i+1}$, second position data informative of a position of second marine objects $SNDMOBJ_{1,i+1}$ to $SNDMOBJ_{M,i+1}$ is obtained. It has to be noted that the second marine objects $SNDMOBJ_{1,i+1}$ to $SNDMOBJ_{M,i+1}$ of time $T_{i+i}$ can differ from the second marine objects $SNDMOBJ_{1,i}$ to $SNDMOB_{JM+i}$ of time $T_i$. This is however not mandatory, and depends on the scenario (in some cases, there is a partial overlap).

$T_{1,i+1}$ and $T_{1,i+1}$ meet a synchronization criterion.

At least some of the first marine objects $FIRSTMOBJ_{1,i+1}$ to $FIRSTMOBJ_{N,i+1}$ are the same as at least some of the second marine objects $SNDMOBJ_{1,i+1}$ to $SNDMOBJ_{M,i+1}$.

Operation $720_i$ is repeated in order to estimate data informative of at least one of a height and an orientation of the at least one imaging device of the marine vessel. As a consequence, data informative of at least one of a height and an orientation of the imaging device 120 is estimated at a given period of time $T'_{i+1}$, which substantially coincides with the first period of time $T_{i,i+1}$ and the second period of time $T_{2,i+1}$ (as mentioned, the first period of time $T_{1,i+1}$ and the second period of time substantially $T_{2,i+1}$ coincide since they meet a synchronization criterion). In other words, $T'_i+\sim T_{1,i+1} \sim T_{2,i+1}$.

The method therefore enables to estimate at least one of a height and an orientation of the imaging device 120 over time.

According to some embodiments, height and/or orientation of the imaging device 120 is estimated in real time or quasi real time (a small delay can be present due to the time for the sensors of the marine vessel to acquire the data, and the time for processing this data).

Assume that data informative of at least one of a height and an orientation of the imaging device 120 is estimated at a given period of time (corresponding to a given iteration i of the method of FIG. 7C). In some embodiments, this data can be used to improve estimation of at least one of a height and an orientation of the imaging device 120 at a subsequent period of time (corresponding to a given iteration i+1 of the method of FIG. 7C). For example, the estimation obtained at iteration i can be used as a starting point of the algorithm which attempts to estimate the height and/or orientation at iteration i+1. In other words, results of a previous iteration can be used to improve estimation at a subsequent iteration.

In some embodiments, and as explained hereinafter, estimation of the height and/or orientation of the imaging device 120 includes determining an association or match between the first marine objects and the second marine objects at a given iteration. The association determined at a given iteration "i" of the method can be reused as an input of the method at a subsequent iteration "i+1" (or more generally at an iteration "j", with j>i), to improve determination of the association at the subsequent iteration. For example, as explained hereinafter, if two given marine objects have been identified as matching at a previous iteration of the method of FIG. 7C, a term (reward) can be introduced in a loss function (calculated at a subsequent iteration of the method-see hereinafter embodiments which rely on a loss function) which takes into account this information.

Figure 7D:
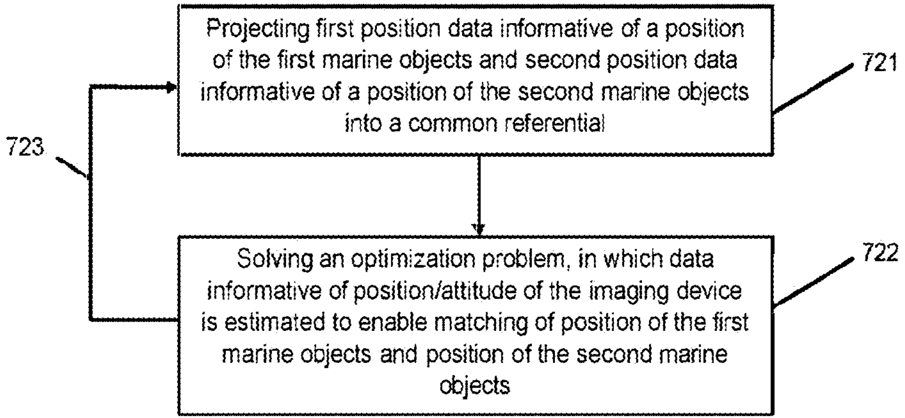
FIG. 7D illustrates operations which can be performed in accordance with the method of FIG. 7.

FIG. 7D illustrates an embodiment of a method which can be used to perform operation 720 or operation $720_1$ or operation $720_i$.

As shown in FIG. 7D, the method includes projecting (721) first position data informative of a position of the first marine objects, and second data informative of a position of the second marine objects, into a common referential.

Although FIG. 7D depicts a sequence in which the first position data is first projected, and then the second position data, this is not limitative, and this could be performed in the opposite way, or simultaneously.

The common referential can correspond e.g., to a global/absolute referential such as world coordinates (latitude, longitude). This is not limitative and other referentials can be used. For example, a predefined set of coordinates which share the same plane can be used (for example the set of coordinates is expressed relative to the marine vessel's position, which is selected as the origin of the set of coordinates).

As explained above, the first position data is generally expressed in the referential of the image (referential of the imaging device 120).

In order to convert the first position data into the common referential, an assumption on the data informative of the height and/or orientation of the imaging device 120 can be made.

Based on this assumption, and the known position of the first marine objects in the referential of the image(s) acquired by the imaging device 120, it is possible to project the first position data from the referential of the image into the common referential.

A method of projecting the first position data into the common referential is described hereinafter with reference to FIG. 7F.

In some embodiments, at least some of the position data is already expressed in the common referential.

For example, an AIS may provide position data in world coordinates.

If position data is provided by a radar, it is possible to convert the position data in world coordinates by using the position of the marine vessel 125. Indeed, since the radar provides relative position (range/bearing), and the position of the marine vessel 125 is known (using e.g., a localization system such as GPS/AIS of the marine vessel 125), it is possible to project the position data into world coordinates (or into another common referential).

Figure 7E:
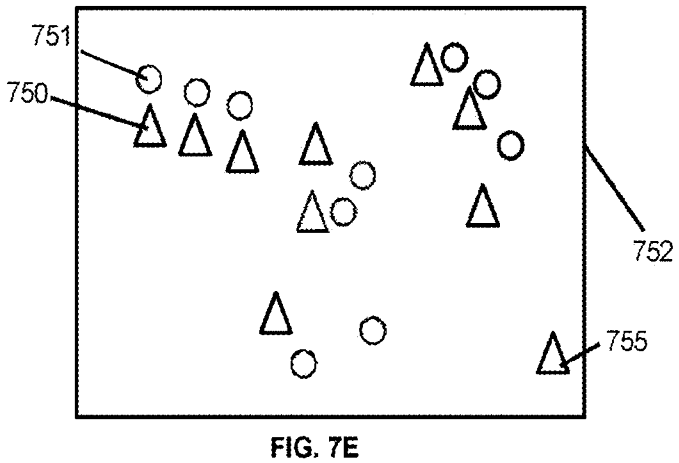
FIG. 7E illustrates schematically a projection of the position of the marine objects acquired by the imaging device and the position of the marine objects acquired by another sensor into a common referential.

FIG. 7E illustrates a projection of the first position data and the second position data into a common referential 752 (a global/absolute referential, such as an Earth referential).

Projection of the first position data into the common referential 752 depends inter alia on the height and orientation of the imaging device 120.

At this stage, since height and/or orientation of the imaging device 120 is unknown (or known with an error), the first position data is projected randomly, and therefore position of the first marine objects (depicted as triangles) does not match position of the second marine objects (depicted as circles).

Figure 7F:
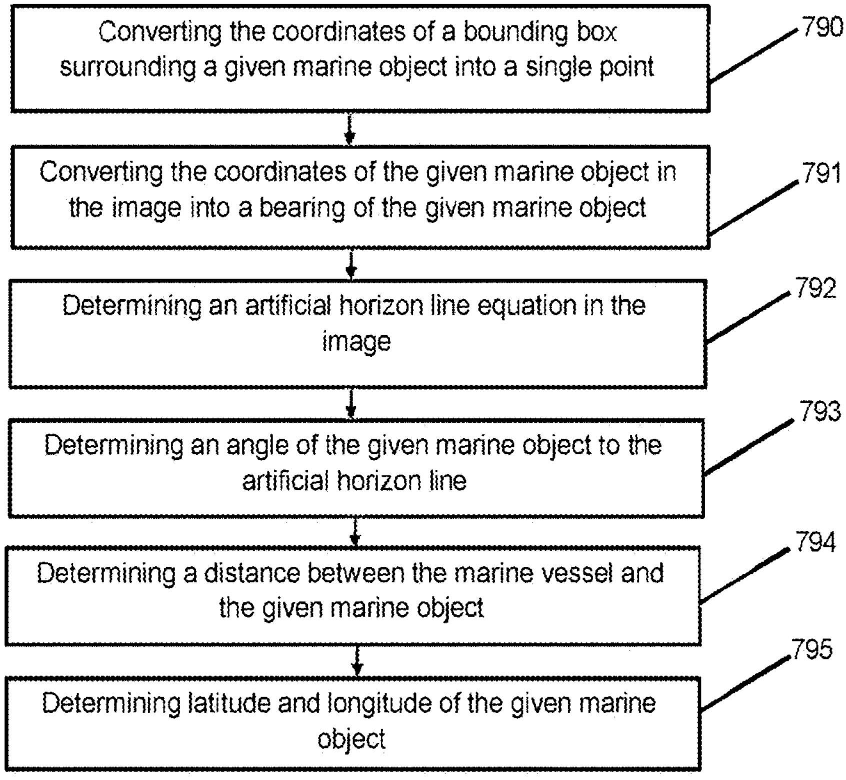
FIG. 7F illustrates an embodiment of a method of projecting position of a marine object from the image to a global/absolute referential (independent of the image)

FIG. 7F illustrates a method of projecting the first position data from the referential of the image into a common referential (global/absolute referential-independent of the referential of the image).

It has to be noted that this method is not limitative, and is provided as an example only.

Figure 7G:
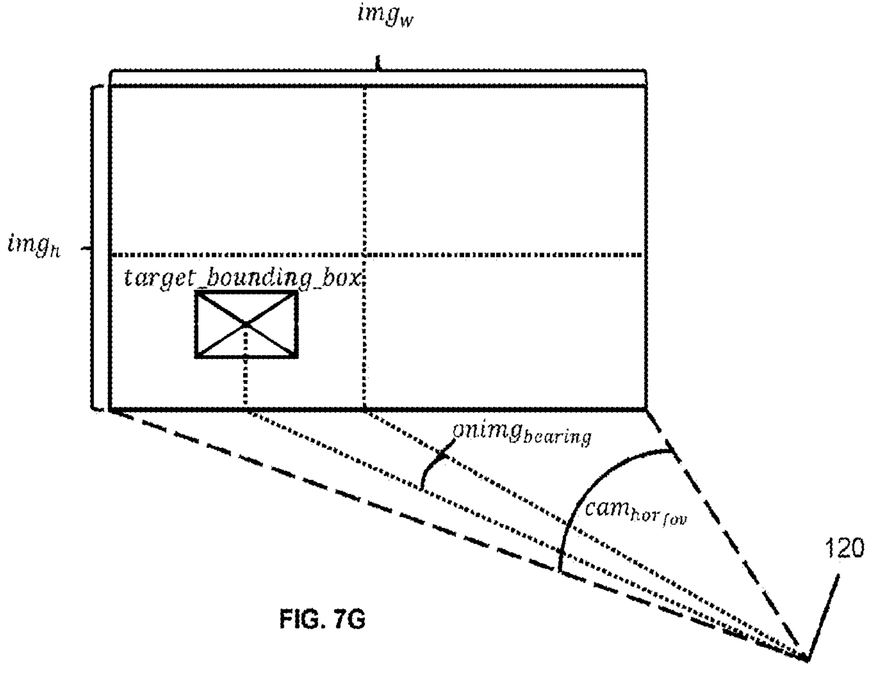
FIGS. 7G to 7J illustrate parameters that can be used in the method of FIG. 7F.

Assume that a given marine object 799 (depicted in FIG. 7J) has been identified in an image acquired by the imaging device 120.

For example, a bounding box (see FIG. 7G, "target_bounding_box") including the given marine object 799 is obtained. Assume the following notations:

i. ($left_{upper_x}$, $left_{upper_y}$) correspond to the coordinates of the left upper point of the bounding box (in the image);

ii. ($right_{bottom_x}$, $right_{bottom_y}$) correspond to the coordinates of the right lower point of the bounding box (in the image);

iii. $cam_{vert_{fov}}$, $cam_{hor_{fov}}$ correspond respectively to the imaging device vertical field of view and to the imaging device horizontal field of view;

iv. $img_w$ and $img_h$ correspond to the image resolution (width by height);

v. $cam_{lat}$, $cam_{long}$ correspond respectively to the latitude and longitude of the imaging device 120;

vi. $cam_{height}$ corresponds to the height of the imaging device 120, relative to sea level (it is assumed that the marine vessel 125 and the given marine object are located at the same water surface);

vii. $cam_{pitch}$, $cam_{roll}$ and $cam_{yaw}$ correspond respectively to the pitch of the imaging device 120, the roll of the imaging device 120 and the yaw of the imaging device 120 (it is generally assumed that the imaging device 120 and the marine vessel 125 form a rigid body); and viii. $targ_{lat}$ and $targ_{lon}$ correspond respectively to the latitude of the given marine object and the longitude of the given marine object;

Parameters (i) to (vii) are the input of the method, and parameter (viii) is an output of the method.

The method includes converting (operation 790) the coordinates of the two extremities of the bounding box into a single point, with coordinates ($target_x$, $target_y$).

$$target_x = \frac{left_{upper_x} - right_{bottom_x}}{2}$$

-continued $$target_y = \frac{left_{upper_y} - right_{bottom_y}}{2}$$

The method includes converting (791) the coordinates ($target_x$, $target_y$) of the given marine object into a bearing (noted global_bearing) of the given marine object expressed in an absolute referential (e.g., Earth referential), as detailed hereinafter.

$$left_{img_{angle}} = -\frac{cam\_hor\_fov}{2}$$

$$right_{img_{angle}} = \frac{cam\_hor\_fov}{2}$$

$$onimg_{bearing} = \frac{\left(target_x\left(right_{img_{angle}} - left_{img_{angle}}\right)\right)}{img_w} + left_{img_{angle}}$$

$$global_{bearing} = (onimg_{bearing} + cam_{yaw} + 360) \bmod (360)$$

Figure 7H:
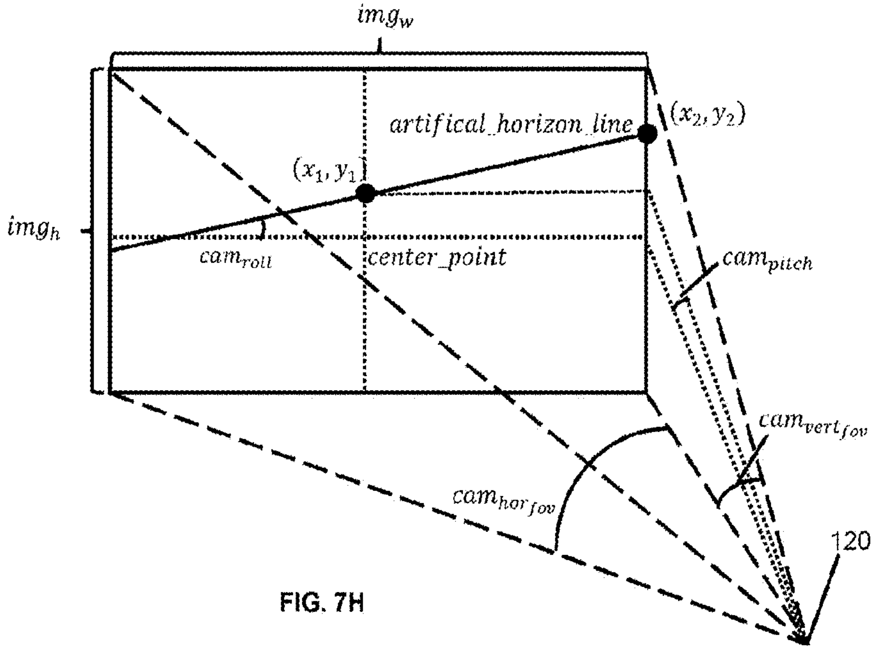

The method further includes (792) determining an artificial horizon line equation in the image (the artificial horizon line corresponds to a reference for which the imaging device 120 has zero roll and zero pitch). FIG. 7H illustrates a non-limitative example of an artificial horizon line and some of the parameters which are used to determine its equation.

A normalization function old_to_new_value ($old_{value}$, $old_{range}$, $new_{range}$) is defined, in which $old_{value}$ is the value that needs to be normalized, $old_{range}$ corresponds to the current range ($old_{min}$, $old_{max}$), $new_{range}$ corresponds to the expected value range ($new_{min}$, $new_{max}$) and $new_{value}$ corresponds to the output of the function. The function old_to_new_value can be defined as follows:

$$new_{value} = \left(\frac{((old_{value} - old_{min})(new_{max} - new_{min}))}{old_{max} - old_{min}}\right) + new_{min}$$

Operation 792 can include setting $cam_{pitch}$ as the output of old_to_new_value ($cam_{pitch}$,(−90,90), (0,180)).

Operation 792 can further include calculating the artificial horizon line location in the image in pixels.

This can include determining pixelpitch as follows:

$$pixel_{pitch} = old\_to\_new\_value\left(cam_{pitch}, \left(90 - \frac{cam_{vert_{fov}}}{2}, 90 + \frac{cam_{vert_{fov}}}{2}\right), (0, img_h)\right).$$

This can further include updating pixelpitch as follows:

$$pixel_{pitch} = abs(\cos(cam_{roll}))\, pixel_{pitch}.$$

This can further include defining ($x_1$, $y_1$) as follows:

$$(x_1, y_1) = \left(\frac{img_w}{2}, pixel_{pitch}\right)$$

$(x_1, y_1)$ corresponds to a first point of the artificial horizon line (see FIG. 7H). This can further include defining $(x_2, y_2)$ as follows:

$$(x_2, y_2) = \left(\frac{img_w}{2}, 0\right), \text{ if } cam_{pitch} = 90;$$

$$(x_2, y_2) = \left(\frac{img_w}{2}, y_1\right), \text{ if } cam_{pitch} = 0 \text{ or } 180;$$

$$(x_2, y_2) = \left(\frac{img_w}{2}, \frac{(y_1 + img_w \tan(cam_{roll}))}{2}\right), \text{ for other values of } cam_{pitch}.$$

$(x_2, y_2)$ corresponds to a second point of the artificial horizon line (see FIG. 7H).

The equation of the artificial horizon line can be calculated using $(x_1, y_1)$ and $(x_2, y_2)$.

Figure 7I:
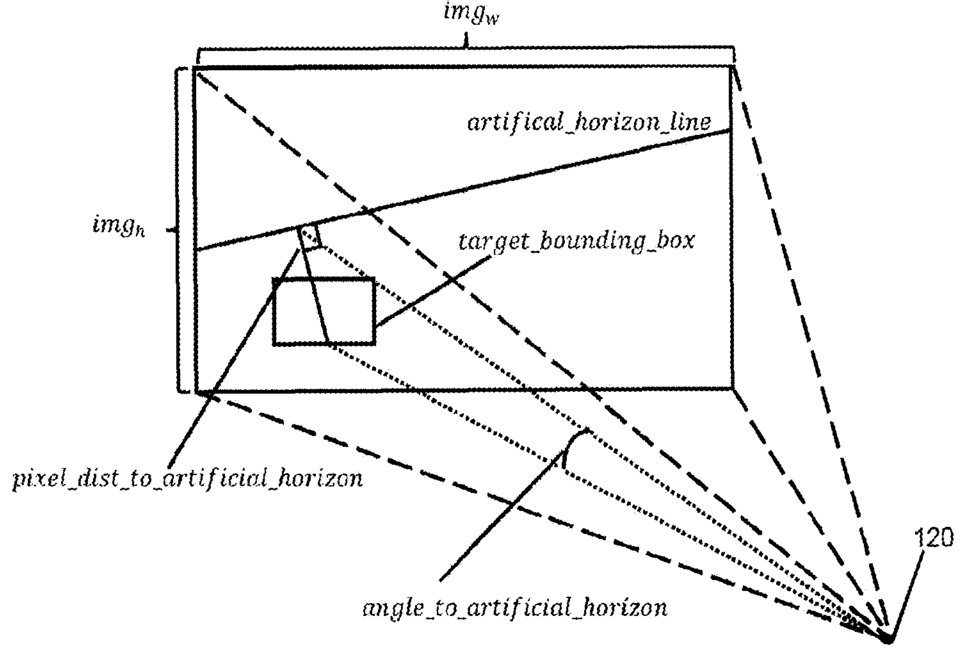
Figure 7J:
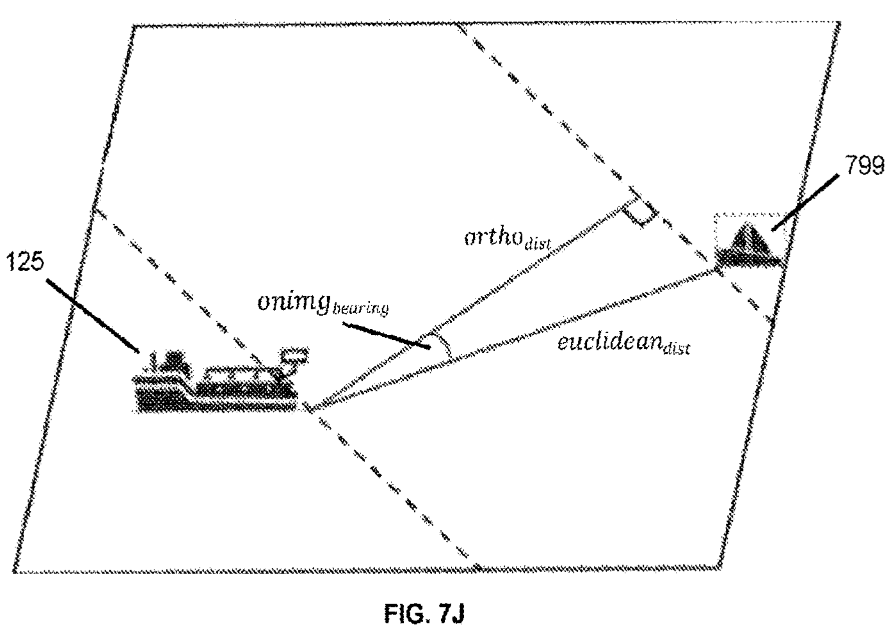

The method further includes (793) determining an angle (noted angle_to_artificial_horizon) of the given marine object with respect to the artificial horizon line (see FIG. 7I). Operation 793 can include determining a distance (see FIG. 7I, pixel_dist_to_artificial_horizon) in pixels in the image between the bounding box of the given marine object (see FIG. 7I, target_bounding_box) and the artificial horizon line (this can be performed by a simple trigonometry calculation). Operation 793 can then include determining angle_to_artificial_horizon using the following computation:

$$\text{angle}_{per_{pixel}} = \frac{cam_{vert_{fov}}}{img_h}$$

$$\text{angle\_to\_artificial\_horizon} = \text{pixel\_dist\_to\_artificial\_horizon} * \text{angle}_{per_{pixel}}$$

The method further includes (794) determining a distance (Euclidean distance, noted euclideandist) between the marine vessel 125 and the given marine object 799, as detailed hereinafter. Operation 794 can include a preliminary step of determining an ortho distance (see FIG. 7J-noted hereinafter ortho_dist) between the marine vessel 125 and the given marine object 799.

$$ortho_{dist} = \tan(90 - \text{angle\_to\_artificial\_horizon})cam_{height}$$

In some embodiments, orthodist can be corrected to take into account curvature of the Earth (see e.g. https://earthcurvature.com).

Operation 794 can then include performing the computation:

$$\text{euclidean}_{dist} = \frac{\text{ortho}_{dist}}{\cos(\text{abs}(onimg_{bearing}))}$$

The method further includes (795) determining absolute coordinates (latitude, longitude) of the given marine object 799. Operation 795 can include the following computation:

$$targ_{lat} = \arcsin\left(\sin(cam_{lat})\cos\left(\frac{d}{R}\right) + \cos(cam_{lat})\sin\left(\frac{d}{R}\right)\cos(\text{bearing})\right)$$

$$targ_{lon} = targ_{lat} +$$

-continued $$a\tan 2\left(\cos\left(\frac{d}{R}\right) - \sin(cam_{lat})\sin(targ_{lat}), \sin(b)\sin\left(\frac{d}{R}\right)\cos(cam_{lat})\right)$$

In this equation, d is equal to euclidean dist, R is the Earth's radius, and b is equal to globalbearing·

The method of FIG. 7D further includes (operation 722) solving an optimization problem. In particular, data $D_{camera}$ informative of a height and/or an orientation of the imaging device 120 is estimated to enable matching of position of at least some of the first marine objects determined using $D_{camera}$ and the first position data, and second position data of at least some of the second marine objects. If $D_{camera}$ is changed, projection of the first marine objects from the referential of the image (first position data) into the common referential 252 is changed (as visible in the equations provided above with reference to FIGS. 7F to 7J-see parameters $cam_{pitch}$, $cam_{roll}$, $cam_{yaw}$ and $cam_{height}$).

This matching can be according to a criterion (as explained hereinafter, the criterion can define e.g., a number of iterations of the method and/or a minimal value for a loss function).

As mentioned above, modification of an estimation of the height and/or orientation of the imaging device 120 ("$D_{camera}$") induces that a projection of the position of the first marine objects from the referential of the image (first position data) into the common referential 752 is modified. Modification of $D_{camera}$ does not affect the projection of the position of the second marine objects acquired by other sensors into the common referential 752.

Solving the optimization problem can include optimizing the estimation $D_{camera}$ of the height and/or orientation of the imaging device 120 to optimize a matching between the position of the first marine objects (as recalculated using $D_{camera}$ and the first position data) and the position of the second marine objects in the common referential. In particular, it is attempted to match between a position of a first marine object and a position of a second marine object which correspond to the same marine object.

In some embodiments, it is possible to estimate additional parameters of the imaging device 120, such as the field of view (data $D_{field\_of\_view}$, such as $cam_{vert_{fov}}$ and $cam_{hor_{fov}}$) of the imaging device 120. Although the field of view of the imaging device is generally known, there can be a distortion which can be estimated.

In this case, solving the optimization problem can also include optimizing the values of the field of view to optimize a matching between the position of the first marine objects (as recalculated using $D_{camera}$, $D_{field\_of\_view}$ and the first position data) and the position of the second marine objects in the common referential.

As visible in FIG. 7D, the method is generally iterative (see reference 723). In other words, solving the optimization problem can include various iterations (e.g. N iterations, with N>1), in which at each iteration $D_{camera}$ (and/or $D_{field\_of\_view}$) is refined to optimize a loss function, until a convergence criterion is met. In some embodiments, the convergence criterion can define a number of iterations, a value to be reached for the loss function, etc.

In some embodiments, the convergence criterion depends on the number (e.g., absolute number or ratio) of associations/matching that have been performed between the first marine objects and the second marine objects. Indeed, the higher the number associations/matching between the first marine objects and the second marine objects, the higher the prospects that an optimal solution to the optimization problem has been found (and the better the estimation of the orientation and/or height of the imaging device).

At each iteration, it is attempted to improve the estimation of the height and/or orientation of the imaging device 120, such that the matching between the position of the first marine objects and the position of the second marine objects in the common referential is improved.

Iteration of the method can include repeating operations 721 and 722.

Figure 7K:
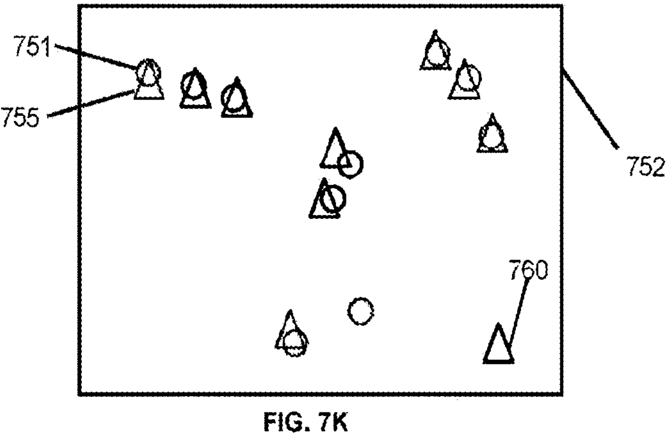
FIG. 7K illustrates an example of an output of the method of FIG. 7D.

FIG. 7K illustrates a projection of the first position data and the second position data into a common referential 752, after N iterations of the method.

As shown, the first marine object which had an initial position 750 at the first iteration of the method, has an optimized position 755 (after N iterations of the method) which matches the position 751 of a second marine object.

Similarly, a plurality of respective first marine objects has an optimized position which now matches the position of a plurality of the respective second marine objects.

However, there can be one or more first marine objects which do not match any of the second marine objects. In FIGS. 7E and 7K, the first marine object which has position 755 at the first iteration of the method, has an optimized position 760 after N iterations of the method, which does not match any position of the second marine objects. This can be due to the fact that this marine object has been acquired only by the imaging device 120 (and not by other sensors 115), or to various factors such as noise, etc.

Figure 7L:
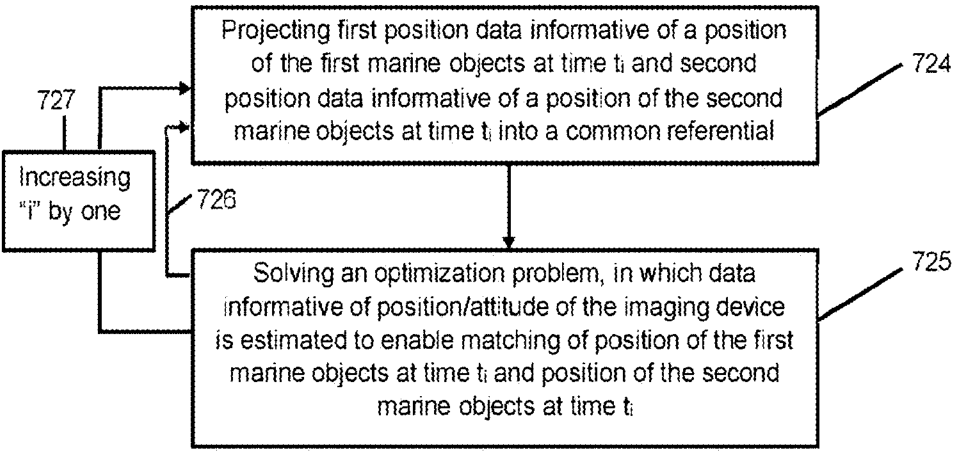
FIG. 7L illustrates operations which can be performed in accordance with the method of FIG. 7A.

Attention is drawn to FIG. 7L.

As explained above (see FIG. 7A or FIG. 7C), in some embodiments, position of the first marine objects and of the second marine objects is obtained at a plurality of periods of time (set of first position data and set of second position data). This can be used to improve estimation of the height and/or orientation of the imaging device 120.

Assume that first position data and second position are obtained for time $t_i$.

The method of FIG. 2L includes projecting (operation 724) first data informative of a position of the first marine objects at time $t_i$ and second data informative of a position of the second marine objects at time $t_i$ into a common referential. Operation 724 is similar to operation 721.

The method further includes solving (operation 725) an optimization problem, in which data $D_{camera}$ informative of height and/or orientation of the imaging device 120 (and/or data $D_{field\ of\ view}$) is estimated to enable matching of position of the first marine objects at time $t_i$ (as recalculated using $D_{camera}$ and the first position data) and the second position data of the second marine objects at time $t_i$.

Operation 725 is similar to operation 722.

For position data of time $t_1$, the method of FIG. 7L can be repeated iteratively (see reference 726), until a convergence criterion is met. Therefore, an estimation of the height and/or orientation of the imaging device 120 is obtained for time $t_i$.

The method can be performed again (see reference 727) at time $t_i+1$ (different from time $t_i$). At time $t_i+1$, position of the first and/or second marine objects may evolve in the common referential.

Estimation of the height and/or orientation of the imaging device 120 of time $t_i$ is not necessarily valid for time $t_{i+1}$, because height and/or orientation of the imaging device 120 can change during the voyage of the marine vessel 125 (due to various factors mentioned above).

Therefore, the method can include performing operations 724 and operations 725 (these operations can be performed iteratively as depicted in reference 726), in order to estimate height and/or orientation of the imaging device 120 at time $t_{i+1}$.

In some embodiments, it is possible to use tracking of the marine objects over time to improve matching between the first marine objects and the second marine objects. In particular, if it has been determined that there is a matching between two given objects (a given object of the first marine objects and a given object of the second marine objects) at different periods of time, there is a high likelihood that the two given objects correspond to the same marine object. Therefore, at subsequent periods of time during which it is attempted to match position of the first marine objects and position of the second marine objects (operation 725), matching of the two given objects should be assigned with a high weight in the optimization problem. This can be performed by introducing a term (reward) in the loss function which takes into account this information.

Figure 7M:
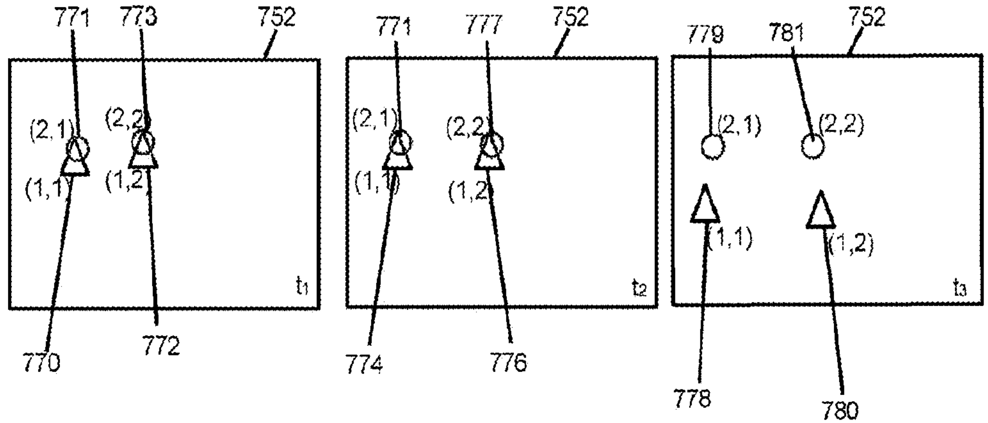
FIGS. 7M and 7N illustrate an embodiment of using tracking data of marine objects to improve solving of an optimization problem in the method of FIG. 7L.

A non-limitative example is provided with reference to FIG. 7M.

Assume that at time $t_i$ (after e.g., a plurality of iterations of the method—as depicted in reference 726), position 770 of a first marine object with tracking ID (1,1) matches a position 771 of a second marine object with tracking ID (2,1), and position 772 of a first marine object with tracking ID (1,2) matches a position 773 of a second marine object with tracking ID (2,2) in a common referential 752.

Assume that at time $t_2$ (after e.g., a plurality of iterations of the method), position 774 of a first marine object with tracking ID (1,1) matches a position 771 of a second marine object with tracking ID (2,1), and position 776 of a first marine object with tracking ID (1,2) matches a position 777 of a second marine object with tracking ID (2,2) in the common referential 752.

At time $t_3$, at the first iteration of the method, a first marine object has position 778 and tracking ID (1,1), another first marine object has position 780 and tracking ID (1,2), a second marine object has position 779 and tracking ID (2,1) and another second marine object has position 781 and tracking ID (2,2).

Figure 7N:
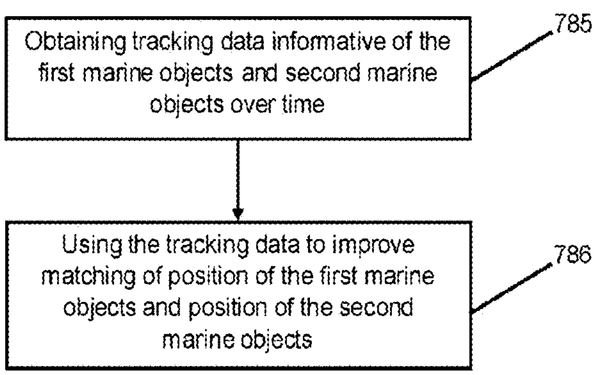

When trying to match the positions of the first marine objects and the second marine objects (operation 725), it is possible to take into account the tracking IDs (as illustrated in operations 785 and 786 of FIG. 7N). Indeed, it has been established at time $t_i$ and time $t_2$ that the first marine object with tracking ID (1,1) corresponds to the second marine object with tracking ID (2,1). Similarly, it has been established at time $t_1$ and time $t_2$ that the first marine object with tracking ID (1,2) corresponds to the second marine object with tracking ID (2,2).

Therefore, at time $t_3$, data informative of the height and/or orientation of the imaging device 120 can be estimated to attempt to match position of the first marine object with tracking ID (1,1) with position of the second marine object with tracking ID (2,1), and to attempt to match position of the first marine object with tracking ID (1,2) with position of the second marine object with tracking ID (2,2) (since there is a high likelihood that these respective positions correspond to the same respective marine object).

Matching of the first and second marine objects relies therefore not only on position, but can rely also on tracking data of the first and second marine objects over time (and/or other parameters, as described hereinafter).

Attention is drawn to FIGS. 3A and 3B.

As mentioned above, in some embodiments, the first data informative of the first marine objects and the second data informative of the second marine objects include data informative of a type of the marine objects.

This can be used to improve matching between the first marine objects and the second marine objects.

Indeed, if it is known that two marine objects correspond to the same type of objects, a higher weight should be assigned in the optimization problem to match these two marine objects (at operations 722 or 725). This can be performed by introducing a term (reward) in the loss function which takes into account this information.

To the contrary, if two marine objects correspond to different types of objects, a low weight should be assigned in the optimization problem to match these two marine objects (at operations 722 or 725). This can be performed by introducing a term (penalty) in the loss function which takes into account this information.

Figure 8A:
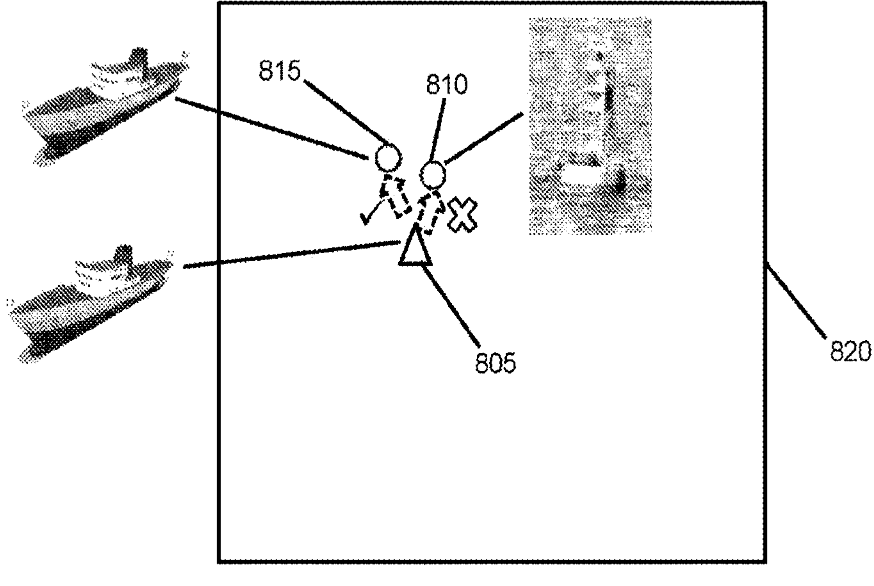
FIGS. 8A and 8B illustrate an embodiment of using types of marine objects to improve solving of an optimization problem in the methods of FIGS. 7D and 7L.
Figure 8B:
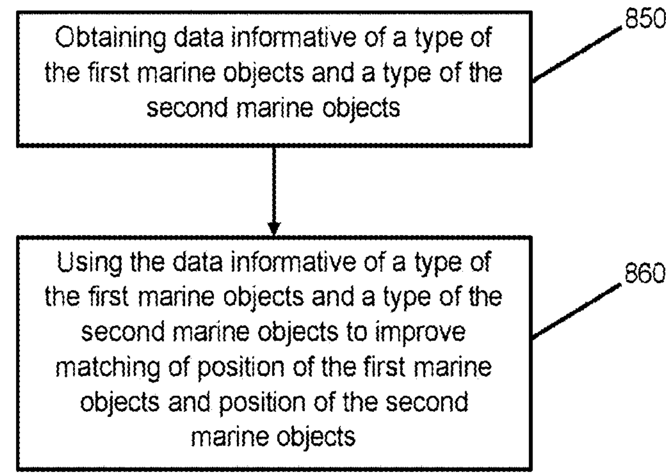

A non-limitative example is shown in FIG. 8B.

Assume that a first marine object has a position 805 in the common referential 820. The first data includes type of objects and indicates that the first marine object is a marine vessel.

Assume that a second marine object has a position 815 in the common referential 820. The second data indicates that this second marine object is a marine vessel.

Assume that another second marine object has a position 810 in the common referential 820. The second data indicates that this second marine object is a buoy.

Although position 805 of the first marine object is closer to position 810 of a second marine object than to position 315 of another second marine object, the method should estimate data informative of height and/or orientation of the imaging device 120 to improve matching between position 805 of the first marine object and position 815 of a second marine object, since these two marine objects both correspond to a marine vessel (whereas the second marine object with position 810 corresponds to a buoy, which is a different marine object).

This is shown in operations 850 and 860 of FIG. 3A which illustrates using data informative of a type of the first marine objects and a type of the second marine objects, to improve matching between position of the first marine objects and position of the second marine objects.

More generally, the method can use various parameters or additional input which can assist in improving the matching (or association) between the first marine objects and the second marine objects.

Figure 9A:
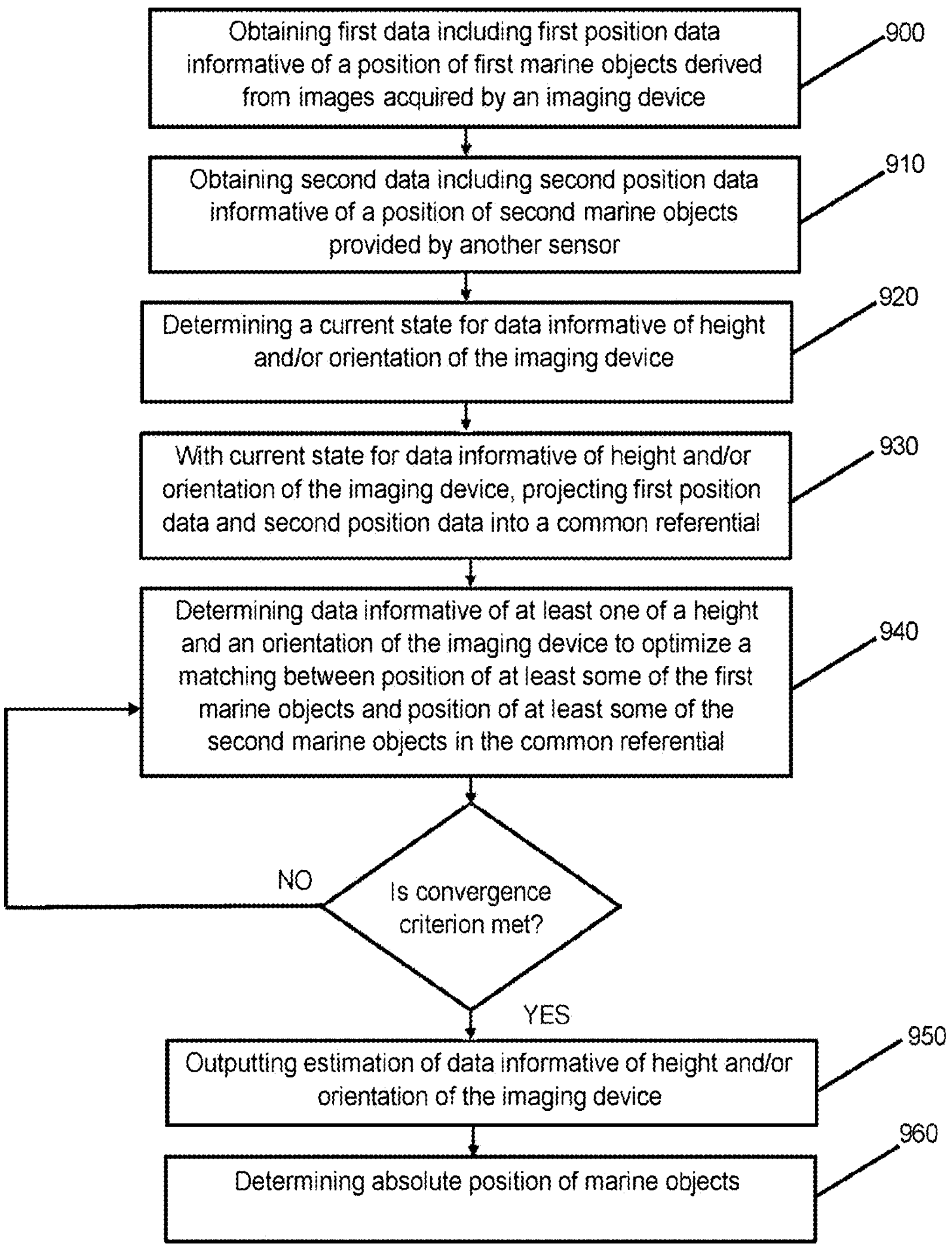
FIG. 9A illustrates an embodiment of the method of FIG. 7.

Attention is now drawn to FIG. 9A, which depicts a particular embodiment of the method of FIG. 7.

The method includes obtaining (operation 900) first data including first position data informative of a position of first marine objects derived from images acquired by the imaging device 120. Operation 900 is similar to operation 700.

The method includes obtaining (operation 910) second data including second position data informative of a position of second marine objects provided by another sensor 115. Operation 910 is similar to operation 710. This other sensor is different from the imaging device 120 and is generally a sensor which is not a camera.

As mentioned above, at least some of the first marine objects and the second marine objects correspond to the same marine objects.

The method further includes determining (operation 920) a current state for data informative of height and/or orientation of the imaging device 120.

At the first iteration of the method, the exact height and/or orientation of the imaging device 120 is unknown. Therefore, operation 920 can include generating a random value for the height and/or orientation of the imaging device 120.

In some embodiments, a first estimation of the height and/or orientation of the imaging device 120 can be available. This first estimation can be provided e.g., by an operator and/or a manufacturer who can have first knowledge on the height and/or orientation of the imaging device 120 (e.g., due to the fact that they installed the imaging device 120 on the marine vessel 125). However, due to various factors mentioned above, this first estimation is no longer exact during voyage of the marine vessel 125, and therefore parameters of the imaging device 120 need to be estimated.

In some embodiments, a first estimation of the height and/or orientation of the imaging device 120 can be provided by an operator located on the marine vessel 125, who measures a first value of the height and/or orientation of the imaging device 120.

Once a current state is available for the height and/or orientation of the imaging device 120, first position data of the first marine objects can be projected (operation 930) into a common referential (e.g., Earth referential—this is however not limitative). An example of this projection is provided in FIG. 7F.

Similarly, the second position data can be projected into the common referential, as already explained above.

The method further includes (operation 940) determining data informative of at least one of a height and an orientation of the imaging device to optimize a matching between position of at least some of the first marine objects and position of at least some of the second marine objects. Examples of an optimization algorithm that can be used include e.g., MSE (Mean Square error), gradient descent, MAE (mean average error), min L2 distance (Euclidean distance), etc. These examples are not limitative.

As mentioned above, operation 940 can include using various additional data to improve matching between the first marine objects and the second marine objects, such as type of marine object, tracking data of marine objects, etc.

A loss function can be calculated to reflect the optimization problem. If the loss function does not meet a convergence criterion (e.g., because its value is above a threshold), the method can be repeated, by repeating operation 940, in which it is attempted to improve estimation of the height and/or orientation of the imaging device 120, in order to improve a match between the loss function and the convergence criterion.

When the loss function of the optimization algorithm meets a convergence criterion (e.g., its value is below a threshold and/or a sufficient number of iterations has been performed), the current state (current estimation) of the height and/or orientation of the imaging device 120 can be output (operation 950). Similarly, the matching between the first marine objects and the second marine objects can be also output, for further usage, as explained hereinafter, such as automatic labelling of the images of a training set (for example, two marine objects acquired by different sensors can be considered as matching when their position in the common referential, as determined using the estimated height/orientation of the imaging device, is substantially similar, or their distance is below a threshold).

According to some embodiments, the method of FIG. 9A includes obtaining first data including first position data informative of a position of first marine objects derived from images acquired by an imaging device 120, second data including second position data informative of a position of second marine objects provided by a first sensor (see reference 115) and third data including third position data informative of a position of third marine objects provided by a second sensor (see reference 115). The first sensor and the second sensor are not imaging devices, and the first sensor can be of a different type than the second sensor. At least some of the first marine objects, the second marine objects and the third marine objects correspond to the same marine objects acquired by different sensors. In this example, the method of FIG. 9A can be performed similarly by projecting positions of all marine objects within a common referential (similar to operation 930) and attempting to determine height and/or orientation of the imaging device 120 which optimize a match between the respective positions of the first, second and third marine objects in the common referential. For example, the height and/or orientation of the imaging device is modified to force the projected position of each of the first marine objects to match, as much as possible, the position of at least one of the second and third marine objects.

It may occur that for a given marine object, it is detected only e.g., by the imaging device and the first sensor, and for another marine object, it is detected only by the first and the second sensors, or only by the imaging device and the second sensor.

As explained hereinafter, once the height and/or orientation of the imaging device 120 is estimated, this data can be used for different marine applications.

According to some embodiments, and as shown in FIG. 9A, assume that a matching between a given marine object of the first marine objects and a given marine object of the second marine objects has been found (as mentioned above, in some embodiments, this matching can be obtained after several iterations of the optimization method).

In other words, this indicates that this given marine object has been identified as the same marine object acquired both by the imaging device 120 and another sensor 115. Therefore, if the other sensor 115 provides second position data informative of the given marine object (e.g. expressed in a global/absolute referential, such as a world referential —for example, sensor 115 is an AIS), it is possible to determine (operation 960) position of the given marine object acquired by the imaging device 120 using the second position data, and in turn, a distance between the marine vessel 125 to the given marine object.

Figure 9B:
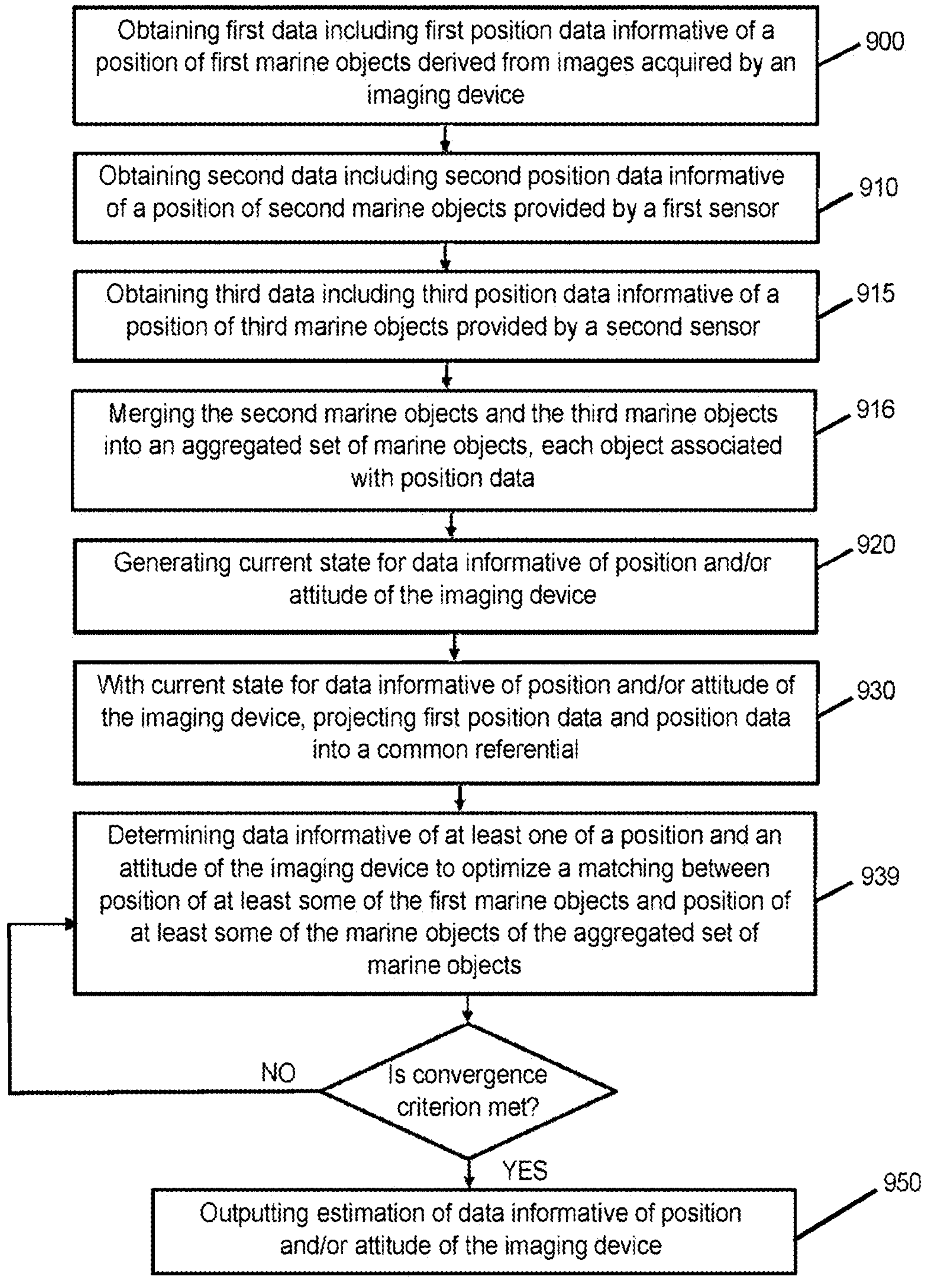
FIG. 9B illustrates another embodiment of the method of FIG. 7.

Attention is now drawn to FIG. 9B, which depicts a variant of the method of FIG. 9A.

The method includes obtaining (operation 900) first data including first position data informative of a position of first marine objects derived from images acquired by an imaging device 120. Operation 400 is similar to operation 200.

The method includes obtaining (operation 910) second data including second position data informative of a position of second marine objects provided by a first sensor (see reference 115). Operation 910 is similar to operation 710. This first sensor is different from the imaging device 120 and is generally a sensor which is not a camera.

The method includes obtaining (operation 915) third data including third position data informative of a position of third marine objects provided by a second sensor (see reference 115).

The second sensor is different from the first sensor and from the imaging device 120. According to some embodiments, the second sensor is not a camera.

According to some embodiments, the second sensor is of a different type than the first sensor (e.g., the first sensor is an AIS and the second sensor is a radar or a LIDAR—this is not limitative).

The method can include an intermediate operation 916, in which at least some of the second marine objects and at least some of the third marine objects are merged, to obtain an aggregated (unified) set of marine objects. This operation is however not limitative.

Each marine object of the aggregated set of marine objects is assigned with position data, which can correspond e.g., to the second position data and/or to the third position data.

Operation 916 can be performed by merging marine objects for which a distance between their positions (in a common referential) is below a threshold, and/or is minimal.

Operation 916 can include solving an optimization problem, in which it is attempted to find pairs of marine objects (each pair including a marine object of the second marine objects and a marine object of the third marine objects), such that the distance between marine objects of each pair is minimized. Optimization algorithms mentioned above can be used.

For example, assume that the first sensor is an AIS and the second sensor is a radar. An AIS provides latitude/longitude of the second marine objects, and it is possible to use the relative range/bearing measurements of the radar and position of the marine vessel 125 to determine latitude/longitude of the third marine objects. Therefore, it is possible to merge the second marine objects and the third marine objects into an aggregated set of marine objects.

Although the method of FIG. 9A is depicted with two sensors (in addition to the imaging device 120), this is not limitative, and any adapted additional sensors (which provide information on position of marine objects surrounding the marine vessel) can be used.

The method further includes, similarly to FIG. 9A, determining (operation 920) the current state for data informative of height and/or orientation of the imaging device 120.

With the current state for data informative of height and/or orientation of the imaging device, the method includes projecting (operation 930) first position data into a common referential (e.g., an absolute referential, such as an Earth referential).

Regarding the position data of the aggregated set of marine objects, in some embodiments, this position data is already expressed in the common referential. Indeed, if at least one given sensor (among the first sensor and the second sensor) provides position data in the common referential, then after merging of the second and third marine objects into an aggregated set of marine objects (see operation 916), it is possible to assign, to each object of the aggregated set of marine objects, position data in the common referential, as provided by the given sensor.

The method further includes determining (operation 939) data $D_{camera}$ informative of at least one of a height and/or an orientation of the imaging device 120 to optimize a matching between position of at least some of the first marine objects determined using $D_{camera}$ and the first position data and position of at least some of the marine objects of the aggregated set of marine objects. Operation 939 is similar to operation 940 but differs in that operation 939 includes matching between the first marine objects and the aggregated set of marine objects (obtained using at least two sensors). In some embodiments, operation 939 can include determining $D_{field\_of\_view}$.

The method can be iterated (e.g., operation 939 can be repeated to fine tune the estimation of $D_{camera}$) until a convergence criterion is met and there is a match between the loss function and the convergence criterion.

Once the convergence criterion is met, an estimation of the height and/or orientation of the imaging device 120 can be output (see operation 950).

As explained hereinafter, once the height and/or orientation of the imaging device 120 is estimated, this data can be used for different marine applications.

Figure 10:
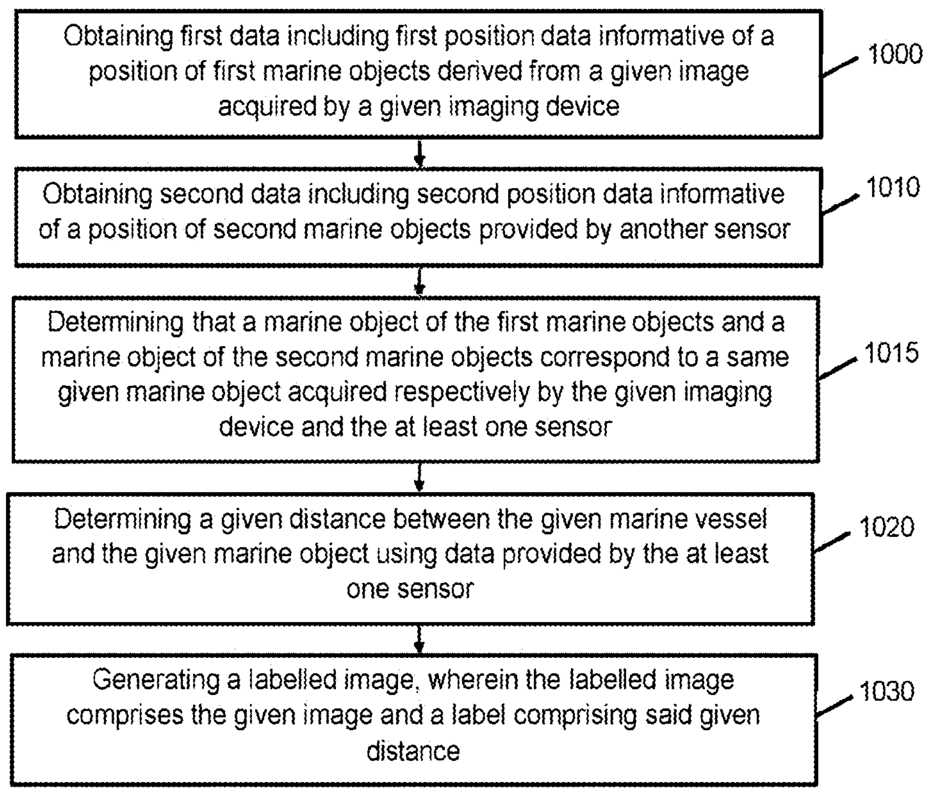
FIG. 10 illustrates an embodiment of a method of generating, automatically, a labelled image of a marine object, which is associated with the distance to the marine object.

Attention is now drawn to FIG. 10.

The method includes obtaining (operation 1000) first position data informative of a position of first marine objects, wherein the first position data is obtained based on a given image acquired by a given imaging device 120 of a given marine vessel 125. Operation 1000 is similar to operations 700 and 900 already described above, and is not described again.

The method includes obtaining (operation 1010) second position data informative of a position of second marine objects, wherein the second position data is obtained based on data acquired by at least one sensor of the given marine vessel 125, wherein the at least one sensor is different from the given imaging device 120, wherein at least some of the first marine objects are the same as at least some of the second marine objects. Operation 1010 is similar to operations 710 and 910 already described above, and is not described again.

As explained in the various embodiments above, a matching can be performed between position of the first marine objects (acquired by the imaging device 120) and position of the second (or even third, or more) marine objects (acquired by other sensors 115).

Various methods have been described above to perform this matching (as mentioned above, these methods can also involve determination of data D camera informative of the height and/or orientation of the imaging device 120 which has acquired the image).

Therefore, the method can include determining (operation 1015) that a marine object of the first marine objects and a marine object of the second marine objects correspond to a same given marine object acquired respectively by the given imaging device and the at least one sensor. As mentioned above, this matching between the first and second marine objects can be performed for a plurality of marine objects.

Once this matching has been performed, it is known that a marine object of the first marine objects and a marine object of the second marine objects correspond to the same given marine object, acquired both by the imaging device 120 and the sensor(s) 115 (since their positions are substantially identical, or with a difference below a threshold). In other words, an association between the first marine objects and the second marine objects has been performed.

In order to augment knowledge of the given marine object, it is possible to use this association and the various parameters provided by the different sensors.

In particular, it is possible to determine a parameter of the given marine object, using data provided by the other sensor 115 which has detected this given marine object (since it is known that the respective acquisitions by the imaging device and the at least one sensor 115 correspond to the same physical object).

According to some embodiments, the at least one sensor 115 (e.g., AIS) can provide information on the position of the marine object. Therefore, it is possible to determine the distance to the given marine object in the image (operation 1020).

As a consequence, it is possible to generate automatically a labelled image, which comprises the image of the marine object and a label indicative of the distance to the marine object (operation 1030).

More generally, it is possible to generate, automatically, a set of labelled images, which comprises the image of a marine object and a label indicative of the distance to the marine object.

In some embodiments, the automatic labelling can include associating the marine object of the image with other parameters, such as the type of the marine object (or other/additional parameters, such as state of the sea, distance of the marine object, etc.). An automatic labelling (sensor labelling) of marine objects is therefore achieved. The labelled images can be used e.g., for supervised training of the neural network 160 configured to determine the distance of marine objects in images. A training with a higher granularity is therefore achieved.

For example, the AIS provides a type (e.g., "cargo") of a given marine object. However, this information can be corrupted, since it is provided by the marine object itself. The imaging device can be used to determine the true type of the given marine object (using e.g., a neural network, which detects the type of the object based on the image).

A set of augmented data/parameters can be determined for each marine object.

As a consequence, a database of images of marine objects (with corresponding augmented data/parameters) can be created, which can be used to train the neural network 160. In particular, for each image, labelled data including distance of the marine object, type of the marine object, etc. can be provided for the training of the neural network 160.

Embodiments of the presently disclosed subject matter are not described with reference to any particular programming language. It will be appreciated that a variety of programming languages may be used to implement the teachings of the presently disclosed subject matter as described herein.

The presently disclosed subject matter contemplates a computer program being readable by a computer for executing one or more methods of the presently disclosed subject matter. The presently disclosed subject matter further contemplates a machine-readable memory tangibly embodying a program of instructions executable by the machine for executing one or more methods of the presently disclosed subject matter.

It is to be noted that the various features described in the various embodiments may be combined according to all possible technical combinations.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the presently disclosed subject matter as hereinbefore described without departing from its scope, defined in and by the appended claims.

The invention claimed is:

1. A system, the system comprising: a processor and memory circuitry (PMC), wherein the PMC is operative to:

obtain first position data informative of positions of first marine objects, wherein the first position data is obtained based on at least one image acquired by a given imaging device of a given marine vessel;

obtain second position data informative of positions of second marine objects, wherein the second position data is obtained based on data acquired by at least one sensor that is not an imaging device and that is different from the given imaging device, wherein at least some of the first marine objects are the same as at least some of the second marine objects;

for each out of a plurality of marine objects of the first marine objects, determine that the respective marine object and a marine object of the second marine objects correspond to a same marine object acquired respectively by the given imaging device and the at least one sensor;

determine data $D_{camera}$ informative of at least an orientation of the given imaging device, including at least roll of the imaging device, at a period of time at which the at least one image has been acquired by the given imaging device, to optimize a matching between: (a) recalculated positions of at least some of the first marine objects, the recalculated positions being determined using $D_{camera}$ and the first position data, and (b) second position data of at least some of the second marine objects;

based at least on $D_{camera}$, determine a distance between the given marine vessel and a given marine object out of the first marine objects, that was acquired by the given imaging device, using data provided by the at least one sensor; and based on the at least one image, generate a labelled image that comprises the given marine object and a label comprising said given distance.

2. The system of claim 1, wherein the second position data is not informative of the position of the given marine object.

3. The system of claim 1, wherein the PMC is operative to match positions of at least some of the first marine objects and positions of at least some of the second marine objects by iteratively modifying a value of an estimated orientation of the imaging device, including at least an estimated roll of the imaging device; and to determine the distance between the given marine vessel and the given marine object further based on results of the matching.

4. The system of claim 3, wherein the at least one image comprises a plurality of images, wherein the PMC is operative to:

obtain the first position data that is informative of positions of different marine objects at distinct times, the first position data being based on the plurality of images acquired by the given imaging device;

obtain the second position data that is informative of positions of different second marine objects at different times;

process the first position data to generate first tracking information for at least one first marine object, indicative of positions of the respective first marine objects at the distinct times;

process the second position data to generate second tracking information for at least one second marine object, indicative of positions of the respective second marine objects at the distinct times; and match the first marine objects and the second marine objects further based on the first tracking information and the second tracking information.

5. The system of claim 4, wherein the PMC is operative to:

obtain first data informative of types of the first marine objects, the first data being based on the at least one image acquired by the imaging device;

obtain second data informative of types of the second marine objects; the second data being based on data acquired by at least one sensor; and match the first marine objects and the second marine objects further based on the types of the first marine objects and on the types of the second marine objects.

6. The system of claim 1, wherein the PMC is operative to match positions of at least some of the first marine objects and positions of at least some of the second marine objects by iteratively modifying a value of an estimated field of view of the given imaging device;

and to determine the distance between the given marine vessel and the given marine object further based on results of the matching.

7. The system of claim 1, wherein the PMC is configured to determine a type of the given marine vessel using data provided by the at least one sensor, and associate the type with the labelled image.

8. The system of claim 1, wherein the PMC is operative to determine the data $D_{camera}$ that is informative of both height and orientation of the given imaging device at the period of time at which the at least one image has been acquired by the given imaging device.

9. The system of claim 1, wherein the PMC is operative to determine the data $D_{camera}$ during a voyage of the given marine vessel, wherein the height and the orientation of the given imaging device change during the voyage, wherein the first position data is obtained based on the at least one image acquired by the given imaging device during the voyage at a time in which the height and the orientation of the given imaging device are unknown.

10. The system of claim 1, further comprising the given imaging device and the at least one sensor.

11. A method for determining a distance between a given marine vessel and a given marine object, the method comprising, executing by a processor and memory circuitry (PMC):

obtaining first position data informative of positions of first marine objects, wherein the first position data is obtained based on at least one image acquired by a given imaging device of a given marine vessel;

obtaining second position data informative of positions of second marine objects, wherein the second position data is obtained based on data acquired by at least one sensor that is not an imaging device and that is different from the given imaging device, wherein at least some of the first marine objects are the same as at least some of the second marine objects;

for each out of a plurality of marine objects of the first marine objects, determining that the respective marine object and a marine object of the second marine objects correspond to a same marine object acquired respectively by the given imaging device and the at least one sensor;

determining data $D_{camera}$ informative of at least an orientation of the given imaging device, including at least roll of the imaging device, at a period of time at which the at least one image has been acquired by the given imaging device, to optimize a matching between: (a) recalculated positions of at least some of the first marine objects, the recalculated positions being determined using $D_{camera}$ and the first position data, and (b) second position data of at least some of the second marine objects; and based at least on $D_{camera}$, determining a distance between the given marine vessel and a given marine object out of the first marine objects, that was acquired by the given imaging device, using data provided by the at least one sensor.

12. The method of claim 11, wherein the determining of the distance is followed by generating a labelled image based on the at least one image, wherein the labelled image comprises the given marine object and a label comprising said given distance.

13. The method of claim 11, wherein the second position data is not informative of the position of the given marine object.

14. The method of claim 11, comprising matching positions of at least some of the first marine objects and positions of at least some of the second marine objects by iteratively modifying a value of an estimated orientation of the imaging device including at least estimated roll of the imaging device; wherein the determining of the distance comprises determining the distance between the given marine vessel and the given marine object further based on results of the matching.

15. The method of claim 14, wherein the at least one image comprises a plurality of images, wherein the first position data is informative of positions of different marine objects at distinct times, the first position data being based on the plurality of images acquired by the given imaging device; wherein the second position data that is informative of positions of different second marine objects at different times; wherein the method comprises:

processing the first position data to generate first tracking information for at least one first marine object, indicative of positions of the respective first marine objects at the distinct times; and processing the second position data to generate second tracking information for at least one second marine object, indicative of positions of the respective second marine objects at the distinct times;

wherein the matching comprises matching the first marine objects and the second marine objects further based on the first tracking information and the second tracking information.

16. The method of claim 11, comprising determining the data $D_{camera}$ that is informative of both height and orientation of the given imaging device at the period of time at which the at least one image has been acquired by the given imaging device.

17. The method of claim 11, further comprising generating a command for actuators of the given marine vessel based on the determined distance for changing a trajectory of the given marine vessel, thereby avoiding a collision of the given marine vessel and the given marine object.

18. The method of claim 11, wherein the steps of obtaining the first position data, obtaining the second position data, determining correspondence between first marine objects and second marine objects, determining the data $D_{camera}$, and determining the distance between the given marine vessel and the given marine object are executed at a first time in which the given marine vessel is positioned at a first height and a first orientation; wherein the method further comprises:

reiterating the steps of obtaining the first position data, obtaining the second position data, determining correspondence between first marine objects and second marine objects, determining the data $D_{camera}$, and determining the distance between the given marine vessel and the given marine object at a second time in which the given marine vessel is positioned at a second height differing from the first height and at a second orientation differing from the first orientation, to determine a second distance between the given marine vessel and the given marine object;

wherein the difference between the first height and the second height and the difference between the first orientation and the second orientation cause the given marine object to appear differently in the at least one image on which the first position data of the first time is based comparing to the at least one image on which the first position data of the second time is based, impacting distance estimation.

19. A non-transitory storage device readable by a machine, tangibly embodying a program of instructions executable by the machine to perform operations comprising:

obtaining first position data informative of positions of first marine objects, wherein the first position data is obtained based on at least one image acquired by a given imaging device of a given marine vessel;

obtaining second position data informative of positions of second marine objects, wherein the second position data is obtained based on data acquired by at least one sensor that is not an imaging device and that is different from the given imaging device, wherein at least some of the first marine objects are the same as at least some of the second marine objects;

for each out of a plurality of marine objects of the first marine objects, determining that the respective marine object and a marine object of the second marine objects correspond to a same marine object acquired respectively by the given imaging device and the at least one sensor;

determining data $D_{camera}$ informative of at least an orientation of the given imaging device, including at least roll of the imaging device, at a period of time at which the at least one image has been acquired by the given imaging device, to optimize a matching between: (a) recalculated positions of at least some of the first marine objects, the recalculated positions being determined using $D_{camera}$ and the first position data, and (b) second position data of at least some of the second marine objects; and based at least on $D_{camera}$, determining a distance between the given marine vessel and a given marine object out of the first marine objects, that was acquired by the given imaging device, using data provided by the at least one sensor.

20. The non-transitory storage device of claim 19, comprising determining the data $D_{camera}$ that is informative of both height and orientation of the given imaging device at the period of time at which the at least one image has been acquired by the given imaging device;

wherein the determining comprises determining the data $D_{camera}$ during a voyage of the given marine vessel, wherein the height and the orientation of the given imaging device change during the voyage, wherein the first position data is obtained based on the at least one image acquired by the given imaging device during the voyage at a time in which the height and the orientation of the given imaging device are unknown;

wherein the second position data is not informative of the position of the given marine object;

wherein the at least one sensor includes at least one of a radar and an automatic identification system (AIS).

* * * * *